(12) United States Patent
Eguchi et al.

(10) Patent No.: US 8,205,234 B1
(45) Date of Patent: Jun. 19, 2012

(54) INFORMATION PROCESSING DEVICE AND METHOD FOR CONTROLLING PROGRAMMED VIDEO RECORDING OF TELEVISION BROADCAST PROGRAM AND RECORDED MEDIUM ON WHICH PROGRAM IS RECORDED

(75) Inventors: Tatsuo Eguchi, Kanagawa (JP);
Yasuhiko Terashita, Kanagawa (JP);
Yasuo Nomura, Kanagawa (JP);
Yasushi Miyajima, Kanagawa (JP);
Yoshikazu Watanabe, Kanagawa (JP);
Nobuaki Yamaguchi, Tokyo (JP);
Kumiko Sasaki, Kanagawa (JP);
Makoto Niijima, Tokyo (JP); Ai Suzuki, Tokyo (JP); Shinya Fujii, Tokyo (JP);
Yusuke Tani, Kanagawa (JP)

(73) Assignee: Sony Corporation, Tokyo (JP)

( * ) Notice: Subject to any disclaimer, the term of this patent is extended or adjusted under 35 U.S.C. 154(b) by 896 days.

(21) Appl. No.: 09/720,537

(22) PCT Filed: Apr. 24, 2000

(86) PCT No.: PCT/JP00/02671
§ 371 (c)(1),
(2), (4) Date: Jun. 27, 2001

(87) PCT Pub. No.: WO00/65828
PCT Pub. Date: Nov. 2, 2000

(30) Foreign Application Priority Data

Apr. 26, 1999 (JP) .................................... P11-118767
Jul. 23, 1999 (JP) .................................... P11-208871

(51) Int. Cl.
G06F 3/00 (2006.01)
G06F 13/00 (2006.01)
H04N 5/445 (2011.01)
H04N 7/173 (2011.01)

(52) U.S. Cl. ................ 725/58; 725/38; 725/39; 725/51; 725/105; 725/114

(58) Field of Classification Search .................... 725/39, 725/46, 51, 54
See application file for complete search history.

(56) References Cited

U.S. PATENT DOCUMENTS

| 6,591,292 | B1 * | 7/2003 | Morrison et al. | 709/206 |
| 7,028,326 | B1 * | 4/2006 | Westlake et al. | 725/39 |
| 2002/0032907 | A1 * | 3/2002 | Daniels | 725/51 |

FOREIGN PATENT DOCUMENTS

| JP | 10-155131 | 6/1998 |
| JP | 10-164487 | 6/1998 |
| JP | 10-174028 | 6/1998 |

OTHER PUBLICATIONS versit Consortium; vCalendar: The Electronic Calendaring and Scheduling Exchange Format Version 1.0; Sep. 18, 1996.*

(Continued)

Primary Examiner — Dominic D Saltarelli
(74) Attorney, Agent, or Firm — Oblon, Spivak, McClelland, Maier & Neustadt, L.L.P.

(57) ABSTRACT

A recording reservation data comprised of text data indicating the information that the text data is the recording reservation data, the information specifying the date and time of starting the recording, the information specifying a channel for recording, the information specifying the date and time of start of the recording and the information specifying the time of end of the recording is transmitted.

16 Claims, 28 Drawing Sheets

OTHER PUBLICATIONS

U.S. Appl. No. 09/441,557, filed Jan. 30, 2001, Pending.
U.S. Appl. No. 09/773,911, filed Feb. 2, 2001, Pending.
U.S. Appl. No. 09/773,918, field Feb. 2, 2001, Pending.
U.S. Appl. No. 09/556,949, filed Apr. 21, 2000, Pending.
U.S. Appl. No. 09/556,750, filed Apr. 21, 2000, Pending.
U.S. Appl. No. 09/557,172, filed Apr. 21, 2000, Pending.
U.S. Appl. No. 09/720,129, filed May 18, 2001, Pending.

* cited by examiner

```
NEW RESERVE···SET CHANNEL & START DATA & TIME
```
CHANNEL & START DATA & TIME SET

CHANNEL     18ch FUJI TV  ▼
START DATE  FEB 28, 1999  ▼
START TIME  16 HR ▼   30 MIN ▼

[ CANCEL ]   [ NEXT ]   [ HELP ]

FIG.13

```
NEW RESERVE···SET END TIME & RECORDING MODE
```
RECORDING RESERVE END TIME & RECORDING MODE SET

CHANNEL      18ch FUJI TV

START TIME   FEB 28, 1999   16HR 30MIN

END TIME     FEB 28, 1999   18 HR ▼   30 MIN ▼

RECORDING MODE  STANDARD ▼
RECORDING TIME :      1HR 00MIN
USED DISC CAPACITY :  2574.92MB
NON-USED DISC CAPACITY : 9999.00MB

[ CANCEL ]  [ RETURN ]   [ NEXT ]   [ HELP ]

FIG.14

NEW RESERVE···CONFIRMATION

RESERVE RECORDING TO BE MADE BY FOLLOWING SETTING-OK ?

| | |
|---|---|
| START TIME : | FEB 16, 1999 16HR 30MIN |
| END TIME : | FEB 16, 1999 18HR 30MIN |
| CHANNEL : | 8ch FUJI TV |
| RECORDING MODE : | STANDARD |
| PERIODIC : | ONCE |
| TERM OF VALIDITY OF CONTENTS : | NONE |
| CONTENT NAME : | HOGEHOGE |
| LIBRARY OF DESTINATION OF STORAGE : | TEMPORARY STORAGE |
| MEMO : | |

[ CANCEL ]  [ RETURN ]    [ COMPLETE ]  [ HELP ]

FIG.15

| GUIDE | | 1ch | | 3ch | | 4ch | 6ch |
|---|---|---|---|---|---|---|---|
| | | NHK GENERAL | | NHK EDUCATIONAL | | NTV | TBS |
| 19 HOUR | 0 | 7 HR NEWS<br>▽ TODAY'S NEWS<br>▽ SPORTS CORNER<br>▽ STOCK DATA<br>▽ WEATHER DATA<br>CASTOR  251-1 R<br>             251-2 R | 0 | AFTER SCHOOL CLUB<br>WELCOME JUNIOR<br>     251-5 R<br>     251-6 R | 0 | PROFESSIONAL BASEBALL<br>[GIANTS × DRAGONS]<br>TOKYO DOME<br>COMMENTATOR:<br>PITCHER MOTODAI<br>CASTOR:SABURO NIIDATE<br>251-10 R | 0 | FRIDAY TV 1<br>[EMERGENCY HOSPITAL 24 HRS]<br>251-11 R |
| | 57 | TV MAP | 30 | DACTYLOLOGY | | | |
| | | | 45 | HEALTH FOR TOMORROW 251-7 R | | | |
| 20 HOUR | 0 | DRAMA<br>[NANTARA-KANTARA]<br>         251-3 R | 0 | TONIGHT WITH YOU<br>     251-8 R | | | |
| | 45 | WEATHER FOR LOCAL 251-4 R | 30 | LET'S LEARN BRAILLE 251-9 R | | | |

FIG.16

```
Content-type : application/x-tv-program-info : charset=shift_jis
version : 1
station : NTV
year : 1999
month : 04
date : 06
start : 21:00
end : 21:03
program-title : TUESDAY SUSPENSE QUIZ WHO IS CRIMINAL ?
```

FIG.17

```
1, 0, 0, 1, NHK GENERAL, NHK GENERAL, NHK
3, 0, 0, 3, NHK EDUCATIONAL, NHK EDUCATIONAL, NHK2
4, 0, 0, 4, NIPPON TV, NIPPON TV, NI-TEL, NIPPON TV B NETWORK, NTV
5, 0, 0, 5, SCOPE, SCOPE
6, 0, 0, 6, TOKYO B, TOKYO B, TBS TV, TBS
8, 0, 0, 8, FUJI TV, FUJI TV, FUJI TELEVISION, CX, FUJI
7, 0, 0, 7, VAIO TV, VAIO TV, VAIO
9, 0, 0, 9, NHK SATELLITE (2), NHK SATELLITE (2), BS2, NHKBS2
10, 0, 0, 10, TV ASAHI, TV ASAHI, ZENKOKU ASAHI B, TV-ASAHI, TEL-ASA, ANB, TVASA
11, 0, 0, 11, NHK SATELLITE (1), NHK SATELLITE (1), BS1, NHKBS1
12, 0, 0, 12, TV TOKYO, TV TOKYO, TEL-T, TV TOKYO, TX, TVTOK
```

FIG.18

BEGIN : VCALENDAR
PRODID : –//Sony Corporation//Look look MIMEDIR//EN
VERSION : 1.0
BEGIN : VEVENT
DTSTART : 19990601T210000Z
DTEND : 19990601T214500Z
LOCATION : 1
CATEGORIES : Video
DESCRIPTION : COSE UP ANCIENT AGE
SUMMARY :
PRIORITY : 3
END : VEVENT
END : VCALENDAR

FIG.21

INFORMATION PROCESSING DEVICE AND METHOD FOR CONTROLLING PROGRAMMED VIDEO RECORDING OF TELEVISION BROADCAST PROGRAM AND RECORDED MEDIUM ON WHICH PROGRAM IS RECORDED

TECHNICAL FIELD

This invention relates to an information processing method and apparatus and a medium. More particularly, it relates to an information processing method and apparatus and a medium in which recording can be reserved in a picture recording apparatus.

BACKGROUND ART

The technology of having a tuner enclosed in a personal computer to receive signals of pictures and speech from a television broadcasting station, converting the received pictures and speech into pre-set digital data to record the converted data on a recording medium, such as a hard disc, and of reproducing the recorded data in case of necessity, is finding widespread application.

In such personal computer, setting a channel for reservation recording is extremely labor- and time-consuming.

DISCLOSURE OF THE INVENTION

It is therefore an object of the present invention to enable reservation recording to be set readily and speedily.

An information processing apparatus according to the present invention includes transmission means for transmitting data for controlling the recording of a picture including data for specifying a channel, data indicating the date and time for starting the recording and data indicating the date and time for terminating the recording to a picture recording apparatus.

An information processing method according to the present invention includes a step of transmitting data for controlling the recording of a picture including data for specifying a channel, data indicating the date and time for starting the recording and data indicating the date and time for terminating the recording to a picture recording apparatus.

A medium for permitting a computer to execute a program, according to the present invention, includes a step of transmitting data for controlling the recording of a picture including data for specifying a channel, data indicating the date and time for starting the recording and data indicating the date and time for terminating the recording to a picture recording apparatus.

Another information processing apparatus according to the present invention includes means for generating data configured for controlling the recording of a picture in meeting with a system exploited by a program supervising the personal information, and means for transmitting the data configured for controlling the picture recording to a picture recording apparatus.

Another information processing method according to the present invention includes the steps of generating data configured for controlling the recording of a picture in meeting with a system exploited by a program supervising the personal information, and transmitting the data configured for controlling the picture recording to a picture recording apparatus.

Another medium for permitting a computer to execute a program, according to the present invention, includes the steps of generating data configured for controlling the recording of a picture in meeting with a system exploited by a program supervising the personal information and transmitting the data configured for controlling the picture recording to a picture recording apparatus.

Still another information processing apparatus according to the present invention includes means for inputting data configured for controlling the recording of a picture in meeting with a system exploited by a program supervising the personal information, means for recording a pre-set picture and recording control means for controlling the recording of the recording means based on the data configured for controlling the picture recording.

Still another information processing method according to the present invention includes the steps of inputting data configured for controlling the recording of a picture in meeting with a system exploited by a program supervising the personal information, recording a pre-set picture and controlling the recording at the recording step based on the data configured for controlling the picture recording.

Still another medium for permitting a computer to execute a program, according to the present invention, includes the steps of inputting data configured for controlling the recording of a picture in meeting with a system exploited by a program supervising the personal information, recording a pre-set picture and controlling the recording at the recording step based on the data configured for controlling the picture recording.

A recording reservation data according to the present invention includes text data indicating the information that the text data is the recording reservation data, the information specifying the date and time of starting the recording, the information specifying a channel for recording, the information specifying the date and time of start of the recording and the information specifying the time of end of the recording.

Another recording reservation data comprising text data according to the present invention includes the information specifying the date and time of starting the recording, the recording start date and time specifying information being stated next to the information indicating the start of the recording reservation data "BEGIN:VCALENDAR", "DTSTART:", the information specifying the date and time of end of recording, the recording end date and time specifying information being stated next to "DTEND:", the information specifying a channel for recording, the channel specifying information being stated next to "LOCATION:", the name of a program for recording, recorded next to "DESCRIPTION:" and the information "END:VCALENDAR" indicating the end of the recording reservation data.

BRIEF DESCRIPTION OF THE DRAWINGS

FIG. 13 illustrates a picture by a reservation recording setting program.

FIG. 14 illustrates another picture by a reservation recording setting program.

FIG. 15 illustrates a picture by a reservation recording setting program.

FIG. 16 illustrates a picture of a WWW browser.

FIG. 17 shows an example of recording reservation data.

FIG. 18 shows an example of a channel conversion file.

FIG. 21 shows an example of recording reservation data of the v-calendar system.

BEST MODE FOR CARRYING OUT THE INVENTION

Figure 1:
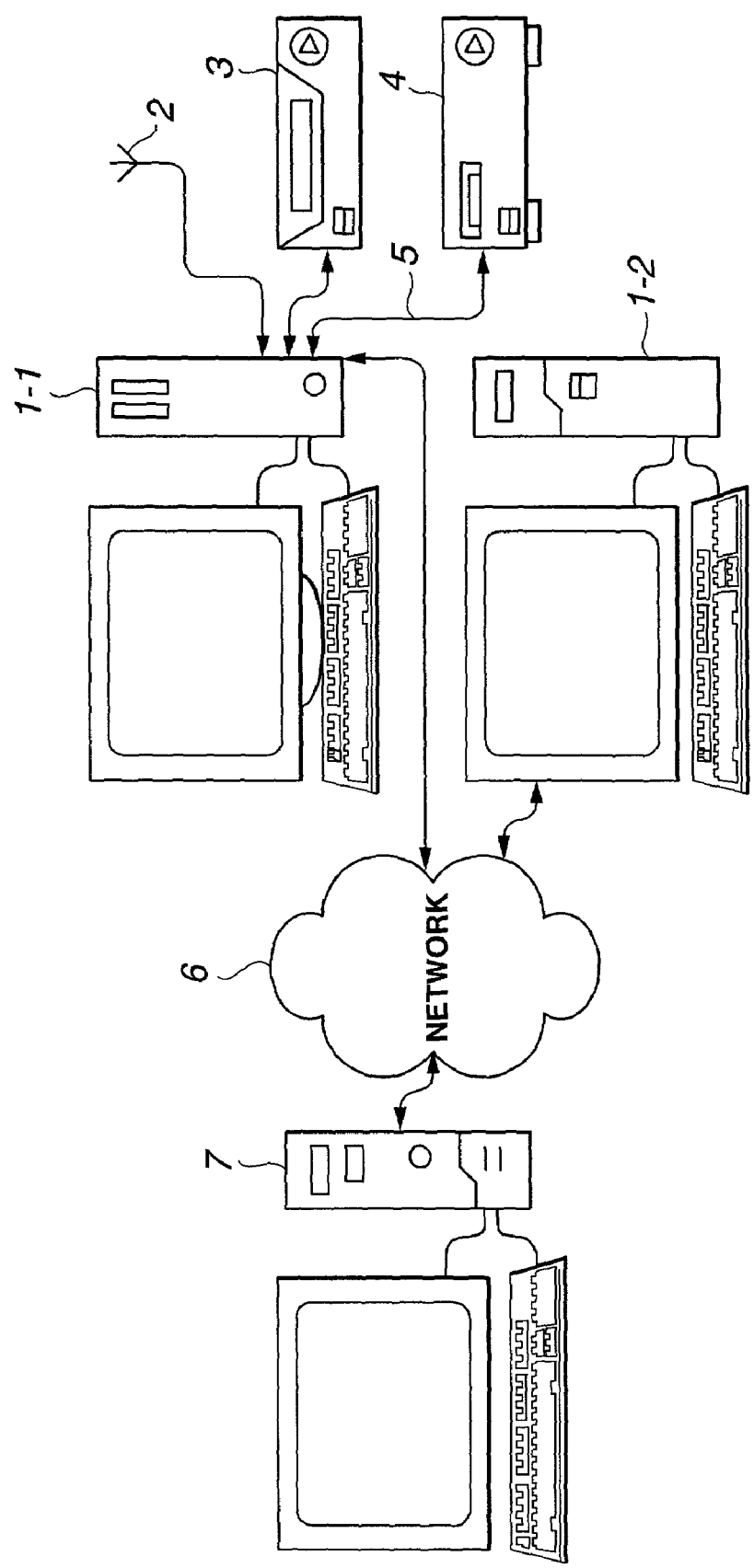
FIG. 1 shows an embodiment of a picture recording and/or reproducing system according to the present invention.
Figure 2:
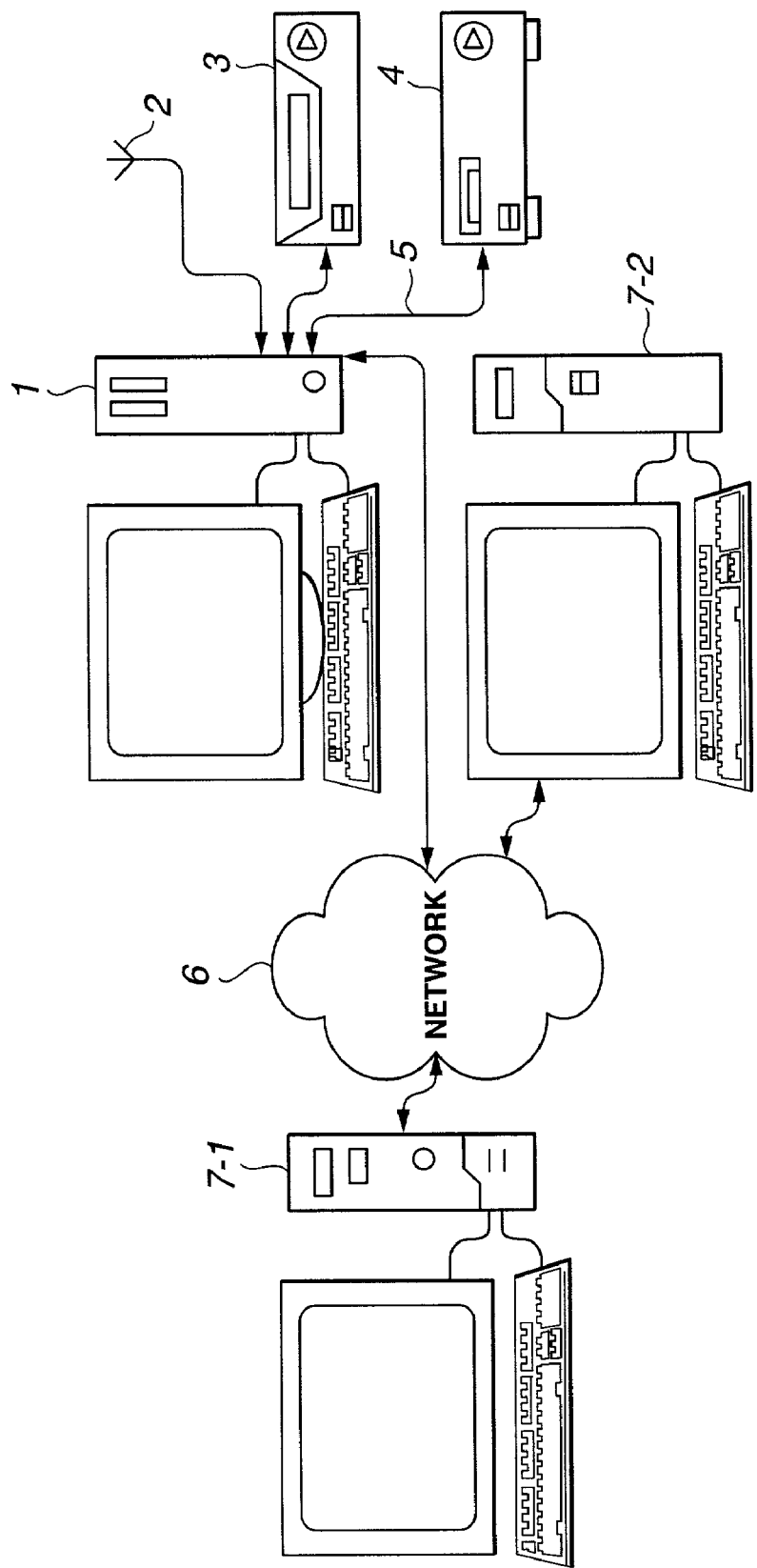
FIG. 2 shows an embodiment of a picture recording and/or reproducing system according to the present invention.

Referring to the drawings, the best mode for carrying out the present invention is explained in detail.

FIG. 1 shows an embodiment of a picture recording and/or reproducing system according to the present invention. A personal computer 1-1 is fed with signals supplied from an antenna 2, adapted for receiving electrical waves transmitted from a specified television broadcasting station, and reproduces a specified picture and speech, that is picture and speech of a so-called television program, while recording the picture and the speech. The personal computer 1-1 also reproduces the picture and the speech corresponding to analog signals supplied from VCR (video cassette recorder) 3 or digital data supplied from DVCR (digital video cassette recorder) 4, over a network 5, such as IEEE (Institute of Electrical and Electronic Engineers) 1394, while recording the picture and the speech.

The personal computer 1-1 sends analog signals corresponding to the recorded speech and picture to the VCR 3, or sends digital data corresponding to the recorded picture and speech to the DVCR 4.

The personal computer 1-1 transmits to the server 7 a message requesting transmission of data for recording reserving of a pre-set program of a pre-set television station, referred to below as recording reservation data, through a network 6, such as Ethernet or Internet, based on the procedure such as HTTP (Hypertext Transfer Protocol). The server 7 is a so-called Web server, adapted for receiving a message requesting transmission of recording reservation data for recording reservation of a pre-set program of a pre-set television broadcasting station, transmitted from the personal computer 1-1, referred to below as the recording reservation data, to transmit to the personal computer 1-1 data for reserved recording of the pre-set program of the pre-set television broadcasting station, associated with the message.

The personal computer 1-1 receives data for recording reservation of the pre-set program of the pre-set television broadcasting station, to execute reserved recording of the pre-set program based on the received data.

The personal computer 1-2 appends recording reservation data for recording reserving of the pre-set program of the pre-set television broadcasting station to an E-mail to send the resulting E-mail over the network 6 to the personal computer 1-1. The personal computer 1-1 receives the E-mail transmitted from the personal computer 1-2 to execute the reserved recording of the program by exploiting the recording reservation data appended to the E-mail.

In FIG. 1, the personal computer 1 also receives an E-mail, having attached thereto data for recording reserving of a pre-set program of a pre-set television broadcasting station, over a network 6, such as Ethernet or Internet, from the personal computer 7. This recording reservation data is e.g., data of the v-calendar system. The personal computer 1 sets recording reserving, based on the recording reservation data appended to the E-mail, to execute the reserved recording of the pre-set program.

The personal computer 1-1 generates the recording reservation data by a PIM (personal information manager) program and appends the generated recording reservation data to the E-mail to transmit the resulting data to the personal computer 7.

A personal computer 7-1 is a personal computer used by a user different from the user of the personal computer 1. The personal computer 7-1 generates recording reservation data by the personal information manager program and attaches the generated recording reservation data to an E-mail which is transmitted to the personal computer 1.

A personal computer 7-2 is a personal computer used by a user different from the user of the personal computer 1 and from the user of the personal computer 7-1. The personal computer 7-2 generates recording reservation data by the personal information manager program and attaches the generated recording reservation data to an E-mail which is transmitted to the personal computer 1.

The personal computer 7-2 receives the E-mail, to which is attached the recording reservation data received from the personal computer 7-1, to display the contents of the recording reservation data by a pre-set personal information manager program. Of course, the personal computer 7-2 is able to receive the E-mail, to which is attached the recording reservation data received from the personal computer 7-1, to transmit the resulting E-mail to the personal computer 1.

The personal computer 7-1 also receives the E-mail, to which is attached the recording reservation data received from the personal computer 7-2, to display the contents of the recording reservation data by a pre-set personal information manager program. The personal computer 7-1 is able to receive the E-mail, to which is attached the recording reservation data received from the personal computer 7-2, to transmit the E-mail to the personal computer 1.

Similarly to the personal computer 7-1 or the personal computer 7-2, the personal computer 1 is able to display the contents of the recording reservation data attached to the E-mail, by the specified personal information manager program, to transmit the E-mail to the personal computer 7-1 or 7-2.

If there is no necessity of distinguishing the personal computer 7-1 and the personal computer 7-2 from each other, the personal computer 7-1 or the personal computer 7-2 is simply termed a personal computer 7.

Figure 3:
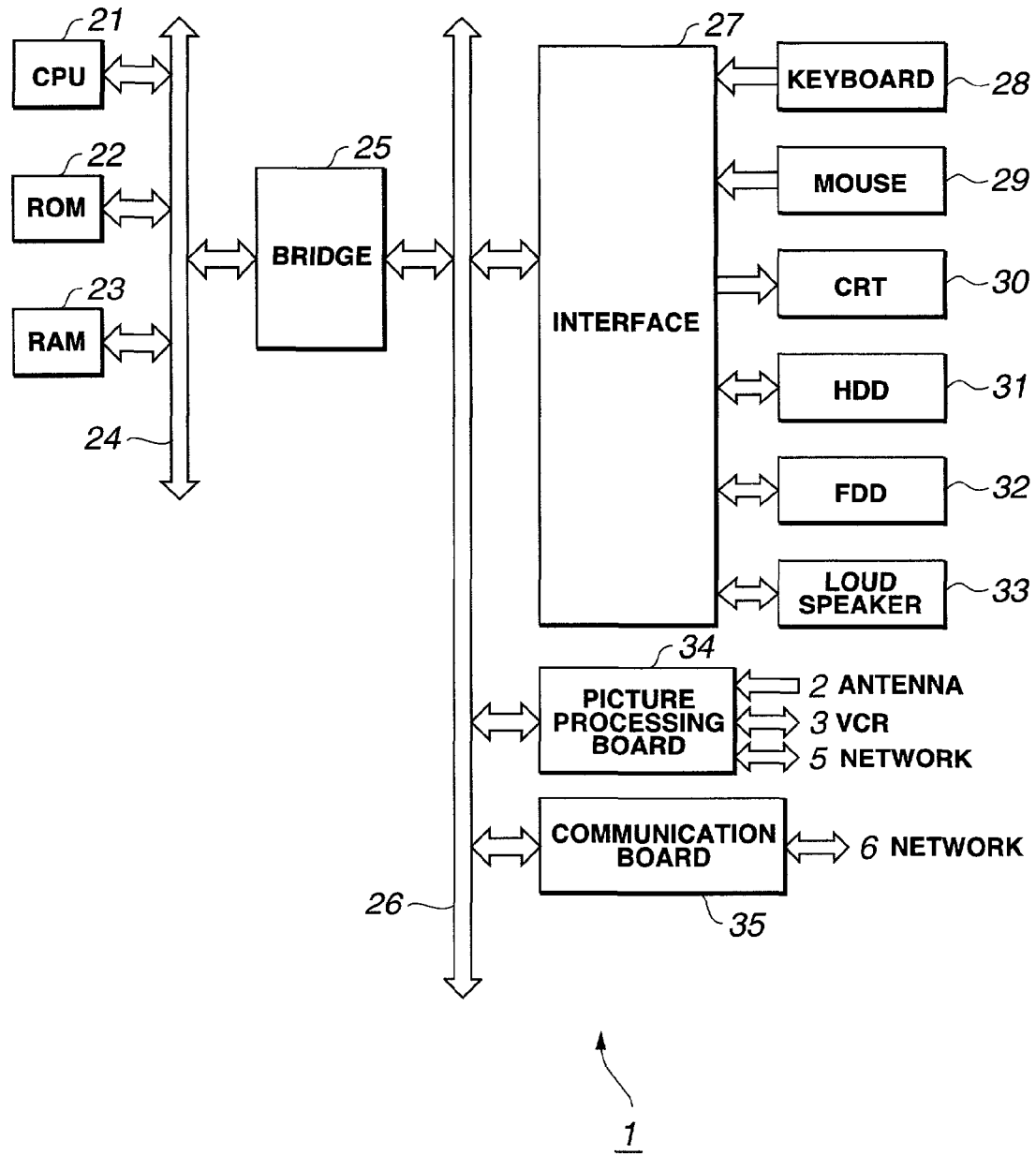
FIG. 3 is a block diagram showing the structure of a personal computer.

FIG. 3 is a block diagram for illustrating the structure of the personal computer 1. A CPU (central processing unit) 21 executes a variety of application programs or a basic operating system (OS). A read-only memory (ROM) 22 generally stores basic stationary data among parameters for arithmetic operations or programs used by the CPU 21. A RAM (random-access memory) 23 stores a program used by the CPU 21 in its operation and parameters incidentally changed as the program proceeds. These components are interconnected by a host bus 24 constructed by a CPU bus or a memory bus.

The host bus 24 is connected via a bridge 25 to an external bus 26, such as a PCI (peripheral component interconnect/interface) bus.

A keyboard 28 is acted upon by a user inputting various commands to the CPU 21. A mouse 29 is acted on by the user commanding or selecting a point on a screen of a cathode ray tube (CRT) 30 configured for demonstrating the various information by texts or images. An HDD (hard disc drive) 31 and an FDD (floppy disc drive) 32 actuate a hard disc and a floppy disc, respectively, to cause the hard disc or the floppy disc to record and/or reproduce the information or the program executed by the CPU 21. A loudspeaker 33 reproduces the specified speech. The above components from the keyboard 28 to the loudspeaker 33 are connected to an interface 27, which in turn is connected to a CPU 71 over the external bus 26, bridge 25 and the host bus 24.

A picture processing board 34 generates specified picture or speech data, based on signals supplied from an antenna 2, digital picture or speech data supplied from the DVCR 3, or picture or speech digital data supplied from the DVCR 4 or the DVCR 5, through the network 6-1, to output the generated data via the external bus 26 and the interface 27 to the HDD 31.

The picture processing board 34 is fed with picture or speech data, recorded on the HDD 31, through the external bus 26 and the interface 27, to generate analog signals corresponding to the input picture or speech data, to send the generated signals to the VCR 3. Alternatively, the picture processing board 34 generates digital data, corresponding to the input picture or speech data, to send the generated data over the network 5 to the DVCR 4.

The picture processing board 34 is connected over the external bus 26, bridge 25 and the host bus 24 to the CPU 71.

A communication board 35 is a device for connection to the network 6. In more detail, it is constituted by an Ethernet board etc and is connected over the external bus 26, bridge 25 and the host bus 24 to the CPU 71.

Figure 4:
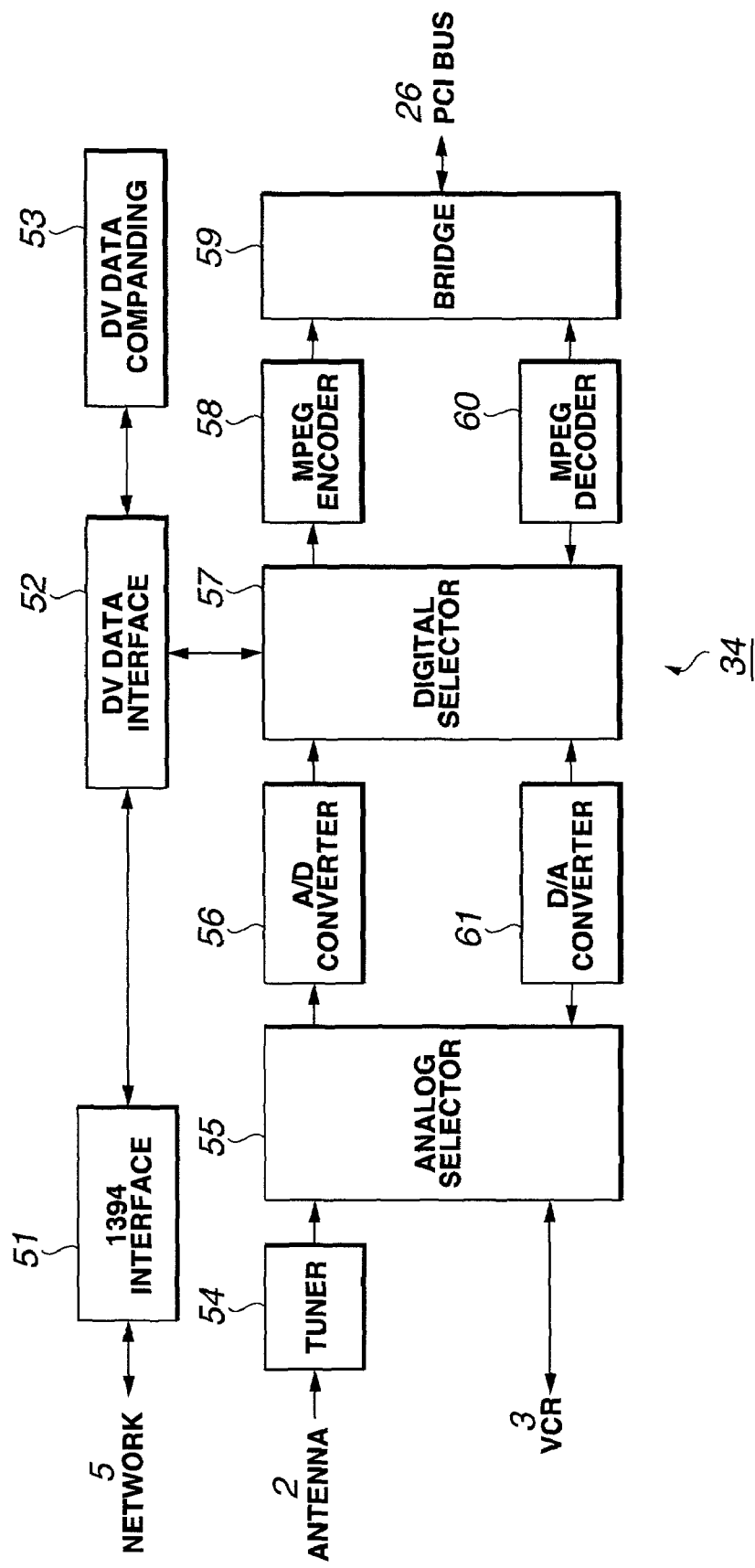
FIG. 4 shows the structure of a picture processing board.

The structure of the picture processing board 34 is now explained. FIG. 4 shows the structure of the picture processing board 34. The 1394 interface 51 is configured in meeting with the prescriptions of the IEEE 1394 interface 51 and is connected to the network 5. The 1394 Interface 51 receives picture or speech digital data of the DVCR format, supplied from the DVCR 4 or the DVCR 5, based on the protocol consistent with the provisions of the IEEE 1394 interface 51, to send the received data to a DV (Digital Video) data interface 52.

The 1394 interface 51 also sends picture or speech digital data of the DVCR format, routed from the DV data interface 52, to the DVCR 4, based on the protocol in meeting with the prescriptions of the IEEE 1394 interface 51.

The DV data interface 52 outputs picture or speech digital data of the DVCR format, sent from the 1394 interface 51, and picture or speech digital data, routed from the digital selector 57, such as so-called non-compressed 4:1:1 digital data, to the DV data companding circuit 53, and also outputs the picture or speech digital data of the DVCR format supplied from the DV data companding circuit 53 to the 1394 interface 51, while outputting the non-compressed picture or speech digital data, supplied from the DV data companding circuit 53 and the digital selector 57, to the digital selector 57.

The DV data companding circuit 53 expands the picture or speech digital data of the DVCR format, supplied from the DV data interface 52, to non-compressed picture or speech digital data, to output the expanded digital data to the DV data interface 52. The DV data companding circuit 53 also compresses the non-compressed picture or speech digital data, supplied from the DV data interface 52, into picture or speech digital data of the DVCR format, to output the resulting compressed digital data to the DV data interface 52.

The tuner 54 is fed with RF (radio frequency) signals, fed from the antenna 2, to output picture or speech analog signals of a specified channel to the analog selector 52. The analog selector selects one of the picture or speech analog signals, sent from the tuner 54, VCR 3 or the D/V (digital/analog) conversion circuit 61, to output the selected signals to the A/D (analog/digital) conversion circuit 56 or the VCR 3.

The A/D conversion circuit 56 converts the picture and speech analog signals, sent from the analog selector 55, into digital data, such as so-called 4:1:1 picture data, to output the converted signals to the digital selector 57. The digital selector 57 is fed with picture and speech digital data output by the DV data interface 52, A/D conversion circuit 56 or the MPEG (Moving Picture Experts Group) decoder 60 to select one of the picture or speech digital data to output the selected data to the DV data interface 52, MPEG encoder 58 or D/A conversion circuit 61, and to a bridge 59.

The MPEG encoder 58 compresses the picture or speech digital data, sent from the digital selector 57, to digital data of the MPEG system, to output the resulting data to the bridge 59. The MPEG encoder 58 also converts a scene change picture into a still picture which is output to the bridge 59.

The bridge 59 outputs the non-compressed picture or speech digital data, supplied from the digital selector 57, to the CRT 30, through the PCI bus 26 of the personal computer 1, carrying the picture processing board 34, and through the interface 27. The bridge 59 outputs the picture or speech digital data of the MPEG system, sent from the MPEG encoder 58, through the PCI bus 26 of the personal computer 1 carrying the picture processing board 34 to the HDD 31 or to the CPU 21. The bridge 59 also receives the picture or speech digital data of the MPEG system from the HDD 31 of the personal computer 1 over the PCI bus 26 to output the received digital data to the MPEG decoder 60.

The MPEG decoder 60 expands the picture or speech digital data of the MPEG system, supplied from the bridge 59, into non-compressed picture or speech digital data, to output the expanded data to the digital selector 57.

The D/A conversion circuit 61 converts the picture or speech digital data, supplied from the digital selector 57, into analog signals, which are output to the analog selector 55.

Meanwhile, the processing corresponding to the MPEG encoder 58 or the MPEG decoder 60 may be executed by the CPU 21 in accordance with a specified program.

Figure 5:
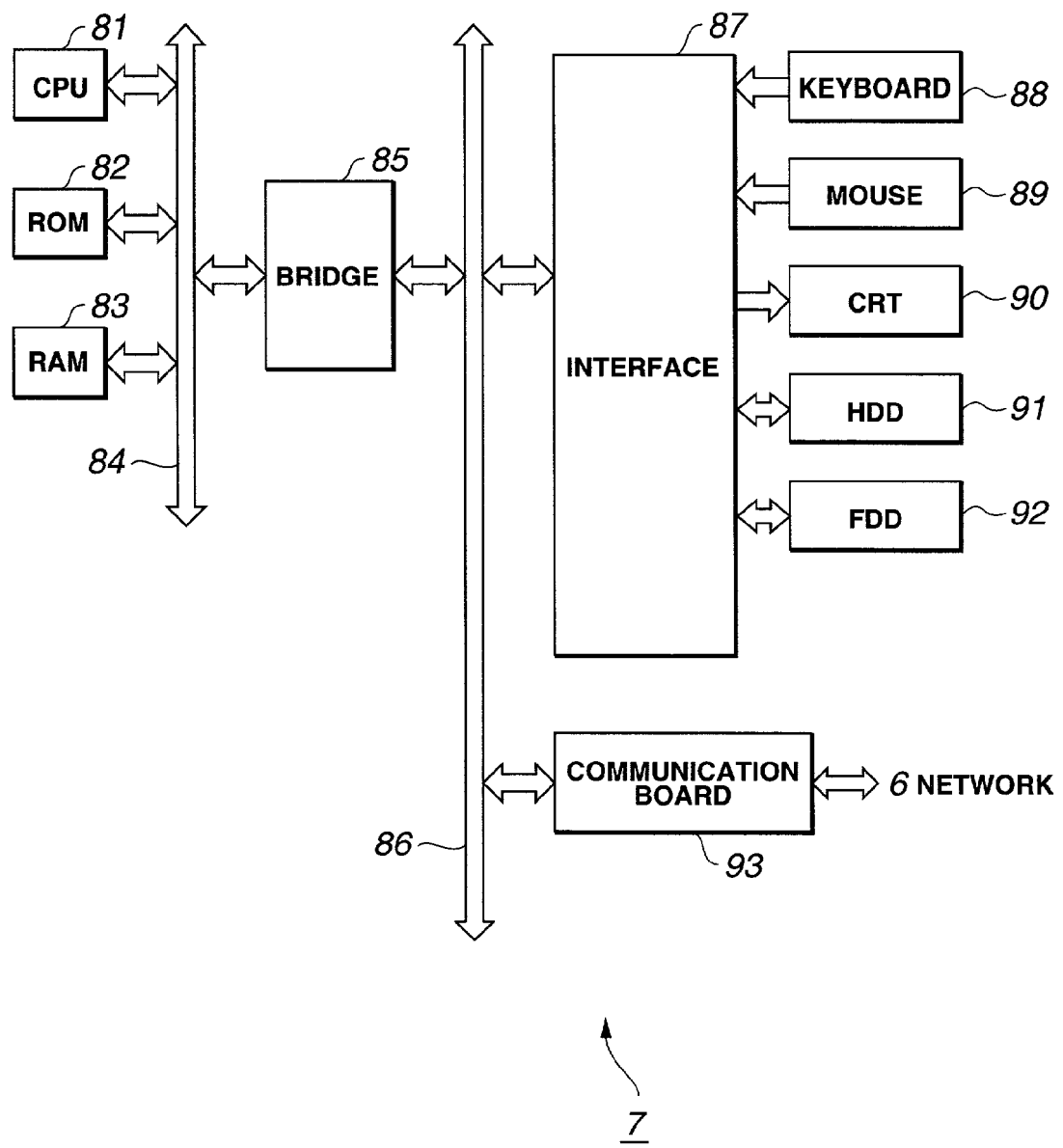
FIG. 5 illustrates the structure of a personal computer.

FIG. 5 illustrates the structure of the personal computer 7. The CPU 81 actually executes a variety of application programs or a basic OS. A ROM 82 stores basically fixed data among parameters for arithmetic operations and the program used by the CPU 81. The RAM 83 stores the program used in the execution of the CPU 81 or parameters incidentally changed during the program execution. These components are interconnected over a host bus 84 constituted by the CPU bus or the memory bus.

The host bus 84 is connected through the bridge 85 to an external bus 86, such as a PCI bus.

A keyboard 88 is acted upon by a user inputting various commands to the CPU 81. A mouse 89 is acted upon by the user making commands or selection of points on a screen of a CRT 90. The CRT demonstrates the various information by texts or images. An HDD 91 and an FDD 92 drive the hard disc or the floppy disc to cause the hard disc or the floppy disc to record and/or reproduce the information or the program executed by the CPU 81. These components from the keyboard 88 to the FDD 92 are connected to an interface 87, which in turn is connected to the CPU 71 through an external bus 86, a bridge 85 and a host bus 84.

A communication board 93 is a device for connection to the network 6, constructed by e.g., an Ethernet board, and is connected to the CPU 71 through the external bus 86, bridge 85 and the host bus 84 to the CPU 71.

Figure 6:
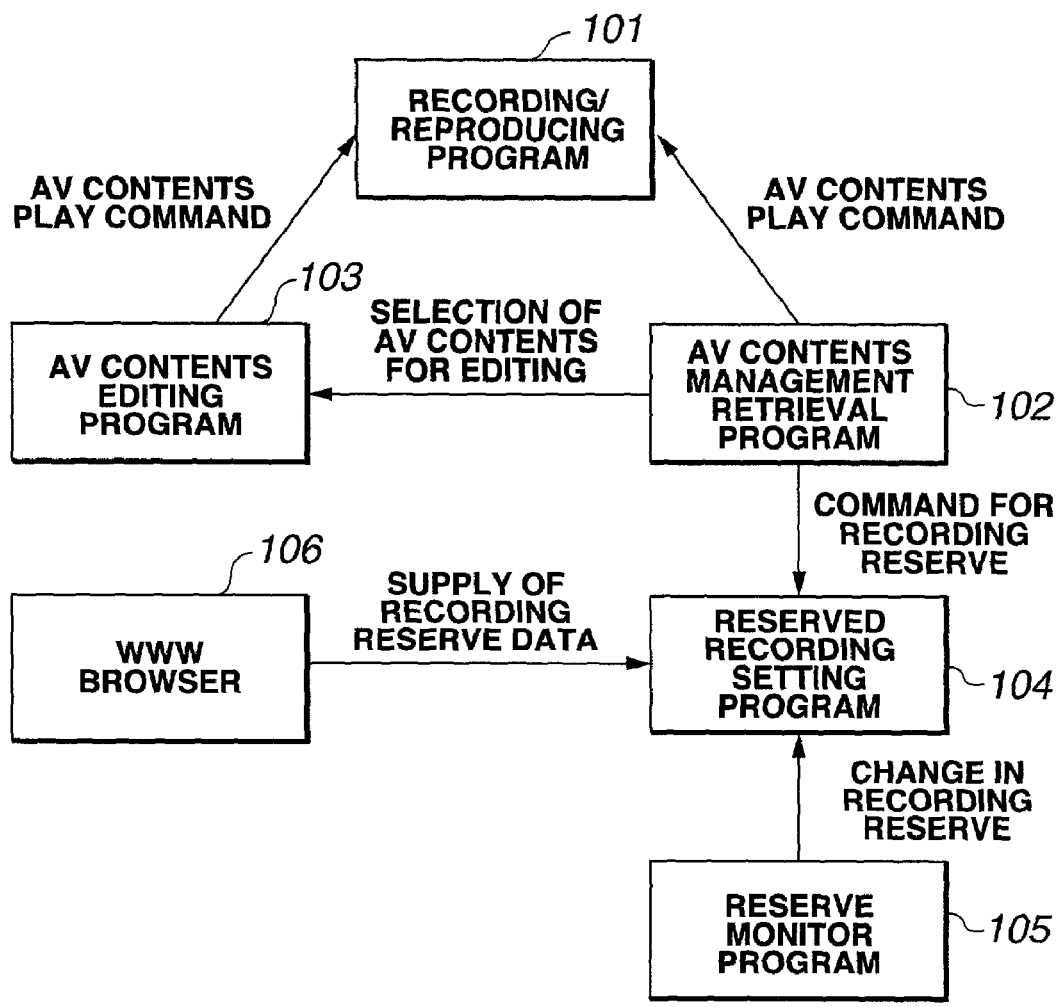
FIG. 6 illustrates an application program executed by the personal computer.

FIG. 6 illustrates an application program executed by the personal computer 1. A recording and/or reproducing program 101 causes the picture processing board 34 to select one of the picture or speech analog signals of a specified channel, as received by the tuner 54, picture or speech analog signals, sent from the VCR 3, and the picture or speech digital data sent over the network 5 from the DVCR 4. The recording and/or reproducing program 101 also converts the selected analog signals or digital data into picture or speech digital data of the MPEG system to record the resulting digital data in the HDD 31 as AV (audio visual) data made up of one or more files of a pre-set format.

The recording and/or reproducing program 101 also causes the picture processing board 34 to expand the AV contents, recorded on the HDD 31 as one or more files of a predetermined format, to generate pre-set non-compressed picture or speech digital data to display the picture on the CRT 30 as well as to reproduce the speech by the loudspeaker 33.

An AV content management retrieval program 102 demonstrates the pre-set information, such as the date and time of recording or the AV contents recorded on the HDD 31. The AV content management retrieval program 102 also commands the recording and/or reproducing program 101 to reproduce the pre-set AV contents to select the AV contents as an object of editing to supply the information of the selected AV content information to an AV content editing program 103 to command reservation recording to a reservation recording setting program 104.

Based on the AV contents recorded on the HDD 31, the AV content editing program 103 edits the pre-set picture and speech of the selected AV contents, that is connects the picture and the speech contained in the pre-set AV contents, to generate AV contents of a pre-set form reproducing the edited picture or speech.

The AV contents are not provided with picture or speech digital data, and are constructed by the information specifying the AV contents as selected, the information exploiting the selected information and the information specifying the speech, and hence can be reproduced by the recording and/or reproducing program 101.

Figure 7:
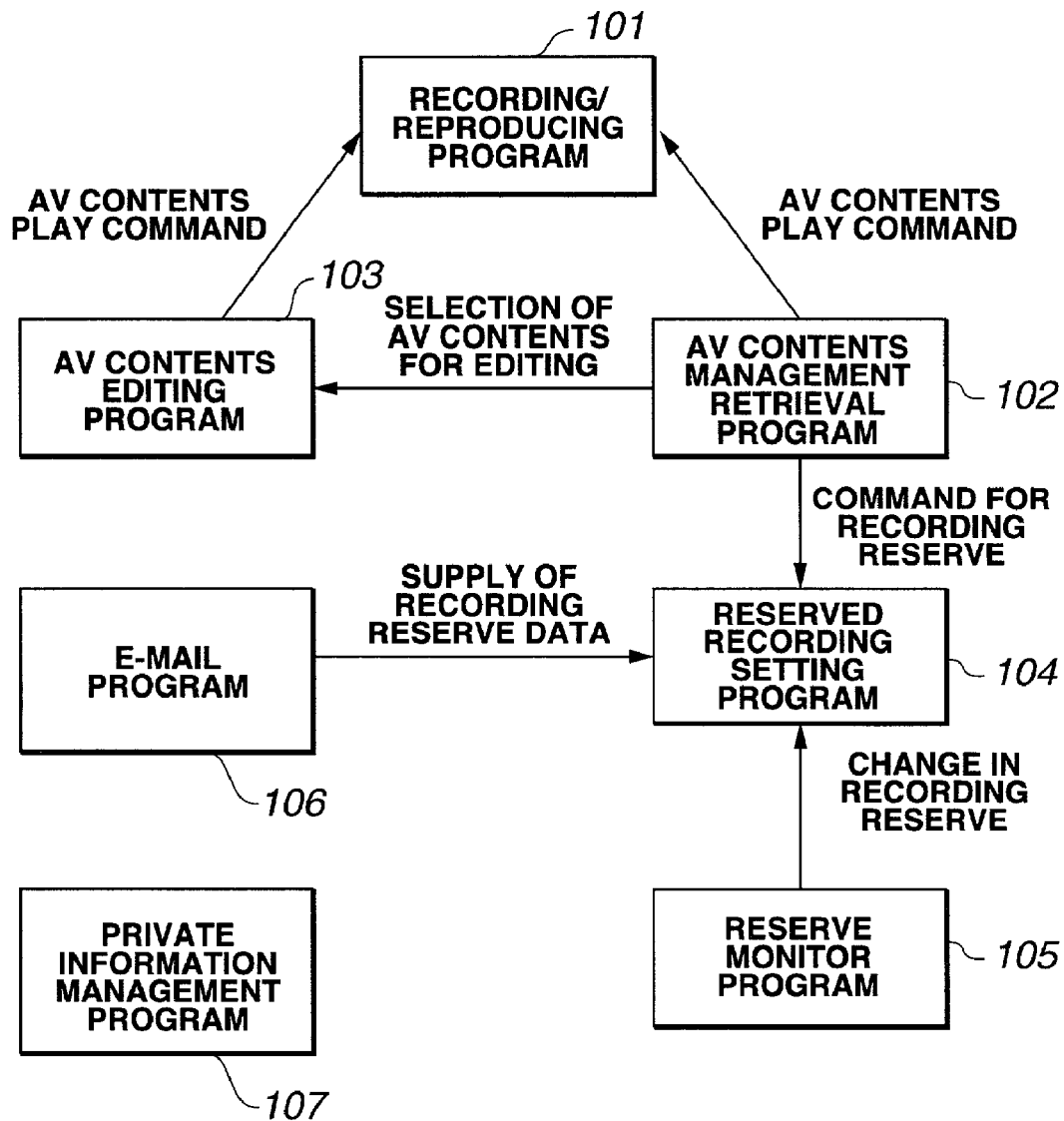
FIG. 7 illustrates an application program executed by the personal computer.

The reservation recording setting program 104 generates the AV contents executing the reservation recording, based on the setting. These AV contents are responsive to the setting (recording time and recording mode determining the picture quality) to secure the storage area for the HDD 31 at the outset. The reservation recording setting program 104 also generates the AV contents executing the reservation recording based on the recording reservation data furnished from the WWW (World Wide Web) browser 106 or an E-mail program (see FIG. 7).

A reservation monitoring program 105 is perpetually in operation (that is, resident) when the personal computer 1 (that is when the OS is running) to execute the reservation recording based on the AV contents for executing the reservation recording generated by the reservation recording setting program 104 and on the time supplied from an RTC (Real Time Clock). The reservation monitoring program 105 also changes the setting of the AV contents executing the reservation recording.

The WWW (World Wide Web) browser 106 requests the server 7 to transmit pre-set recording reservation data, in accordance with the pre-set procedure such as HTTP, and receives pre-set recording reservation data to send the received data to the reserved recording setting program 104.

Figure 8:
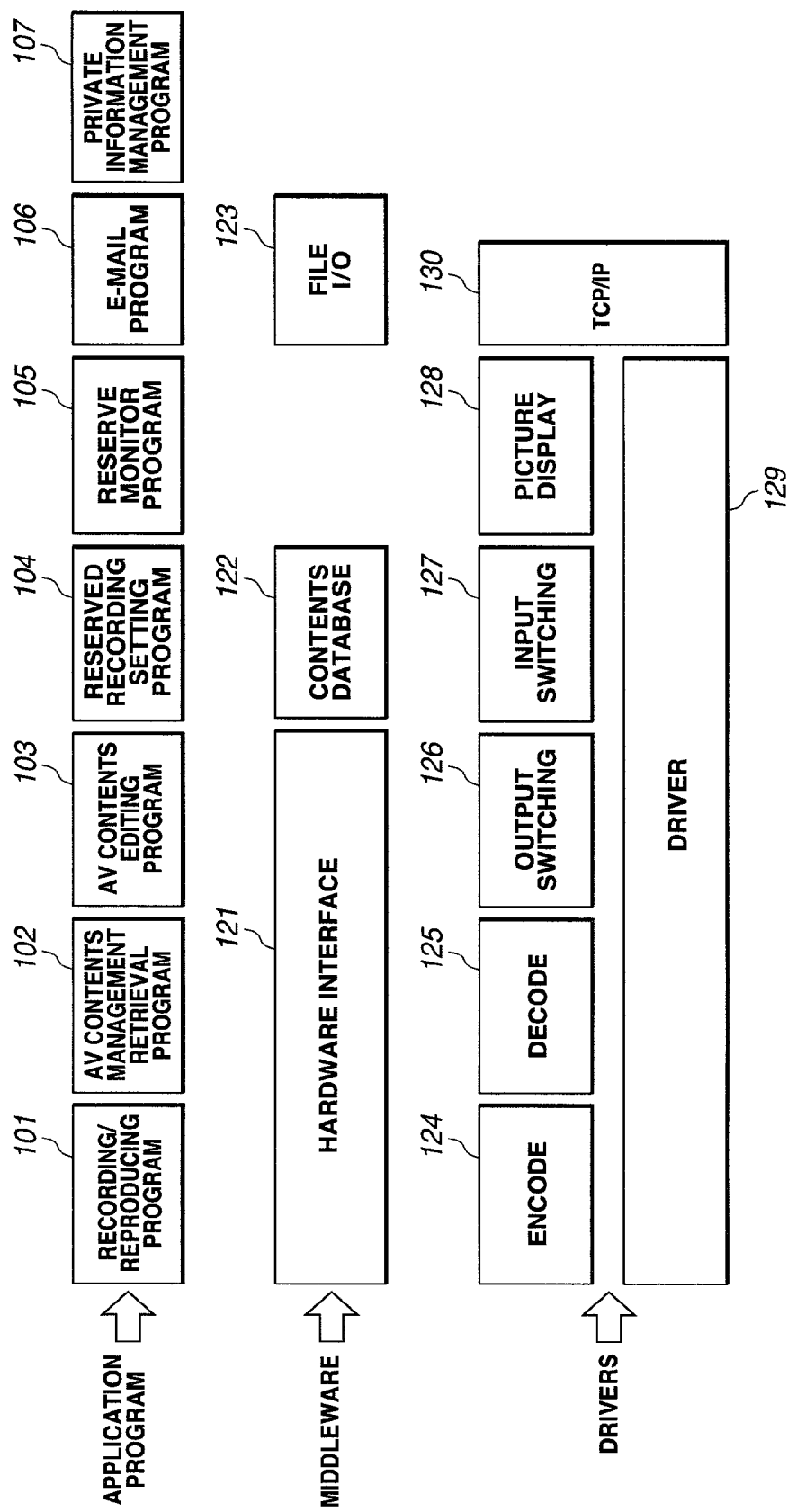
FIG. 8 illustrates the structure of an application program, a middleware and drivers executed by the personal computer.

FIG. 8 illustrates the structures of the application program executed by the personal computer 1, middleware and the drivers. The middleware is responsive to the request from the application program to actuate predetermined drivers. The drivers actually drive the pre-set resources of a hardware, such as MPEG encoder 58 of the picture processing board 34.

A hardware interface 121 arbitrates the use of hardware resources, as required by the recording and/or reproducing program 101, AV contents management retrieval program 102, AV contents editing program 103, recording reservation setting program 104 or the reservation monitoring program 105 to permit the application program to properly utilize specified hardware resources.

A content database 122 is such a database managing attribute data of the AV contents, as later explained, and which furnishes attribute data to the AV contents, as later explained, or data specifying the file memorizing digital picture or audio data corresponding to the AV contents, to the recording and/or reproducing program 101, AV contents management retrieval program 102, AV contents editing program 103, recording reservation setting program 104 or to the reservation monitoring program 105.

A file I/O (input/output) 123 deals with a readout or write request of specified AV contents made up of one or more files of the recording and/or reproducing program 101, AV contents management retrieval program 102, AV contents editing program 103, recording reservation setting program 104 or the reservation monitoring program 105 through the content database 122, and actually executes data readout or data writing for specified files.

An encoder 124 executes the control of causing the MPEG encoder 58 of the picture processing board 34 to compress the picture or speech data inputted from the digital selector 57 into digital data of the MPEG system.

A decoder 125 executes the control of causing the MPEG decoder 60 of the picture processing board 34 to expand the picture or speech digital data of the MPEG system inputted from the bridge 59.

An output switching unit 126 actuates an analog selector 55 and the 1394 interface 51 of the picture processing board 34 to control the outputting of the analog signals from the picture processing board 34 or of the digital data through the network 5.

An input switching unit 127 actuates the analog selector 55, 1394 interface 51, DV data interface 52 and the digital selector 57 to select the analog or digital data inputted to the picture processing board 34.

A screen display 128 actuates the digital selector 57 and the bridge 59 etc to control display of a picture on the CRT 30.

A driver 129 deals with the requests from the encoder 124, decoder 125, output switching unit 126, input switching unit 127 and the screen display 128 to actually drive the picture processing board 34.

A TCP/IP 130 is a specified communication protocol and executes the processing of connecting the web server 125 to the portable telephone set 7.

In the following, explanation on the speech is omitted.

Figure 9:
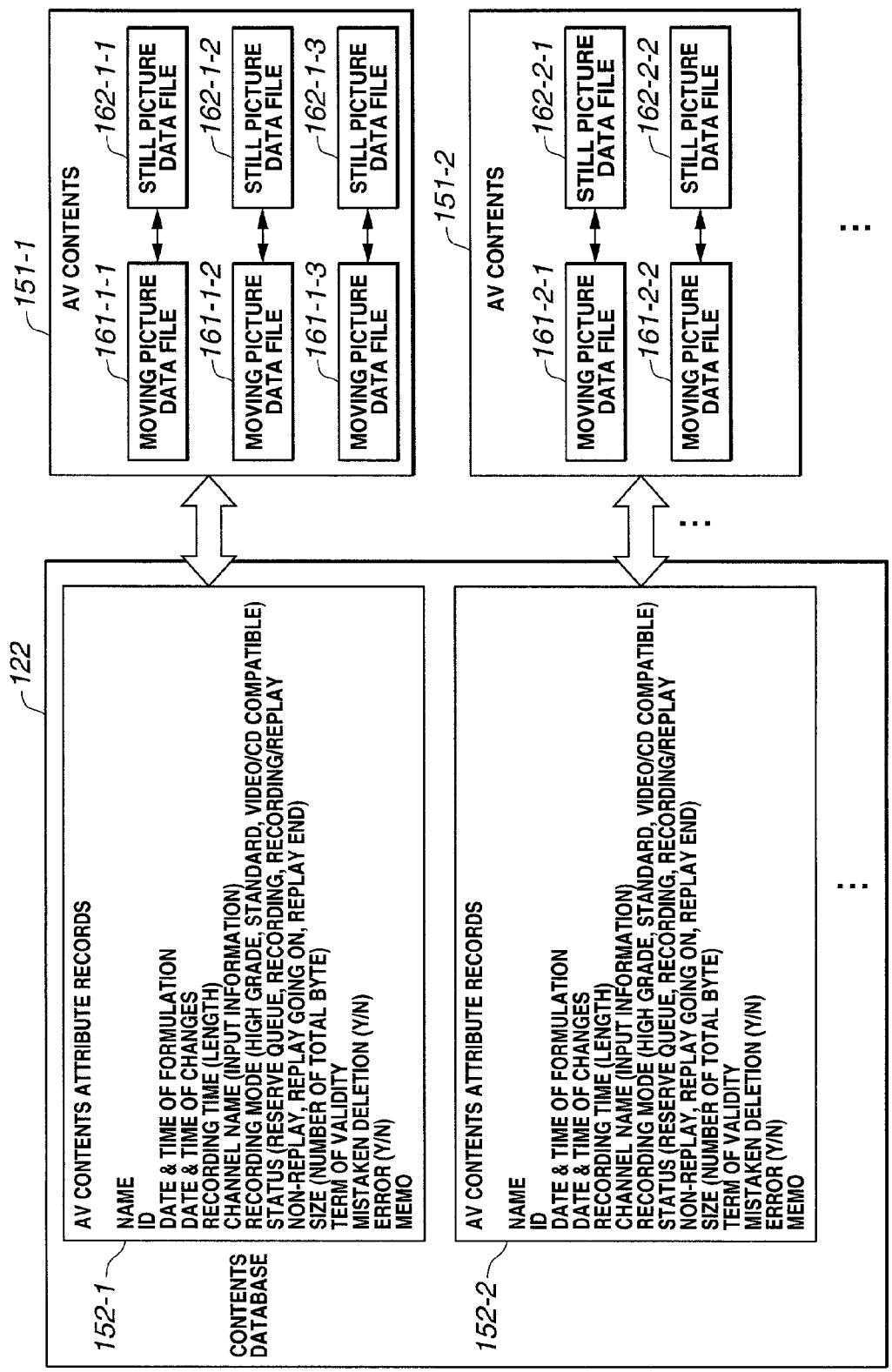
FIG. 9 shows an exemplary structure of AV contents.

FIG. 9 shows an illustrative structure of the AV contents. In the content database 122, recorded in the HDD 31, there are recorded attributes of the respective AV contents. In an AV content attribute record 152-1, recorded in the content database 122, there are stored data, such as name, ID (identification data), date and time of formulation, date and time of change, date and time of recording, channel name, recording mode, state, term of validity, shown by date and time, setting of the mistaken deletion, presence or absence of errors, two-dimensional bar code and memo, as attributes of the AV contents 151-1. In an AV content attribute record 152-2, recorded in the content database 122, there are stored data, such as name, ID, date and time of formulation, date and time of change, date and time of recording, channel name, recording mode, state, term of validity, setting of the mistaken deletion, presence or absence of errors and memo, as attributes of the AV contents 151-2.

The recording mode data stored in the AV content attribute record 152-1 indicate that the moving picture data files 161-1-1 to 161-1-3 are one of high quality, standard and video CD compatible, which video CD compatible specifies that the picture data are of the MPEG-1 system. On the other hand, the status data stored in the AV content attribute record 152-1 indicate that the AV content attribute record 151-1 is in a reservation queue, in recording state, in the recording and/or reproducing state, that is in the state of recording data and reproducing recorded picture data, in the non-reproducing state, in the reproducing state or in the replay end state.

The error indicates the states of the AV content attribute record 151-1, such as the personal computer 1 malfunctioning during recording, recording aborted partway, recording state during recording being bad such that input signals from the antenna 2 are not reproduced, or partial dropout of the moving picture file 161-1-1.

As for the setting of the term of validity and the setting for inadvertent deletion, neither one is set, or one of them is set, while it does not occur that both are set simultaneously.

The recording mode data stored in the AV content attribute record 152-2 indicate that the moving picture data files 161-2-1 to 161-2-3 are one of high quality, standard and video CD compatible. On the other hand, the status data stored in the AV content attribute record 152-2 indicate that the AV content attribute record 151-2 is in the reservation queue, in recording state, in the recording and/or reproducing state, in the non-reproducing state, in the reproducing state or in the replay end state.

The AV content attribute record 151-1 is made up of moving picture data files 161-1-1 to 161-1-3, recorded on the HDD 31, and of moving picture data files 162-1-1 to 162-1-3, recorded on the HDD 31. In the moving picture data files 161-1-1 to 161-1-3, there are stored picture data of the MPEG system. The picture corresponding to the picture data stored in the leading end of the moving picture data file 161-1-2 is consecutive to a picture corresponding to picture data stored in the trailing end of the moving picture data file 161-1-1. Similarly, the picture corresponding to the picture data stored in the leading end of the moving picture data file 161-1-3 is consecutive to a picture corresponding to picture data stored in the trailing end of the moving picture data file 161-1-2.

In a still picture data file 162-1-1, picture data corresponding to a still picture converted from a scene change picture of picture data stored in the moving picture data file 161-1-1 and data on the scene change time are stored. In a still picture data file 162-1-2, picture data corresponding to a still picture converted from a scene change picture of picture data stored in the moving picture data file 161-1-2 and data on the scene change time are stored. In a still picture data file 162-1-3, picture data corresponding to a still picture converted from a scene change picture of picture data stored in the moving picture data file 161-1-3 and data on the scene change time are stored.

The AV contents 151-2 are made up of the moving picture data files 161-2-1 to 161-2-2 and still picture data files 162-2-1 and 162-2-2, and are similar to the AV contents 151-1. Therefore, the AV contents 151-2 are not explained specifically.

If there is no necessity of demarcating the AV contents 151-1 and the AV contents 151-2 from each other, these are simply termed an AV contents 151. If there is no necessity of demarcating the AV contents attribute record 152-1 and the AV contents attribute record 152-2 from each other, these are simply termed an AV contents attribute record 152. If there is no necessity of demarcating the moving picture data files 161-1-1 to 161-1-3 from one another, or if there is no necessity of demarcating the moving picture data files 161-2-1 or 161-2-2 from each other, these are also termed a moving picture data file 161. In addition, if there is no necessity of demarcating the still picture data files 162-1-1 to 162-1-3 or the still picture data files 162-2-1 or 162-2-2 from one another, these are simply termed a still picture data file 162.

Figure 10:
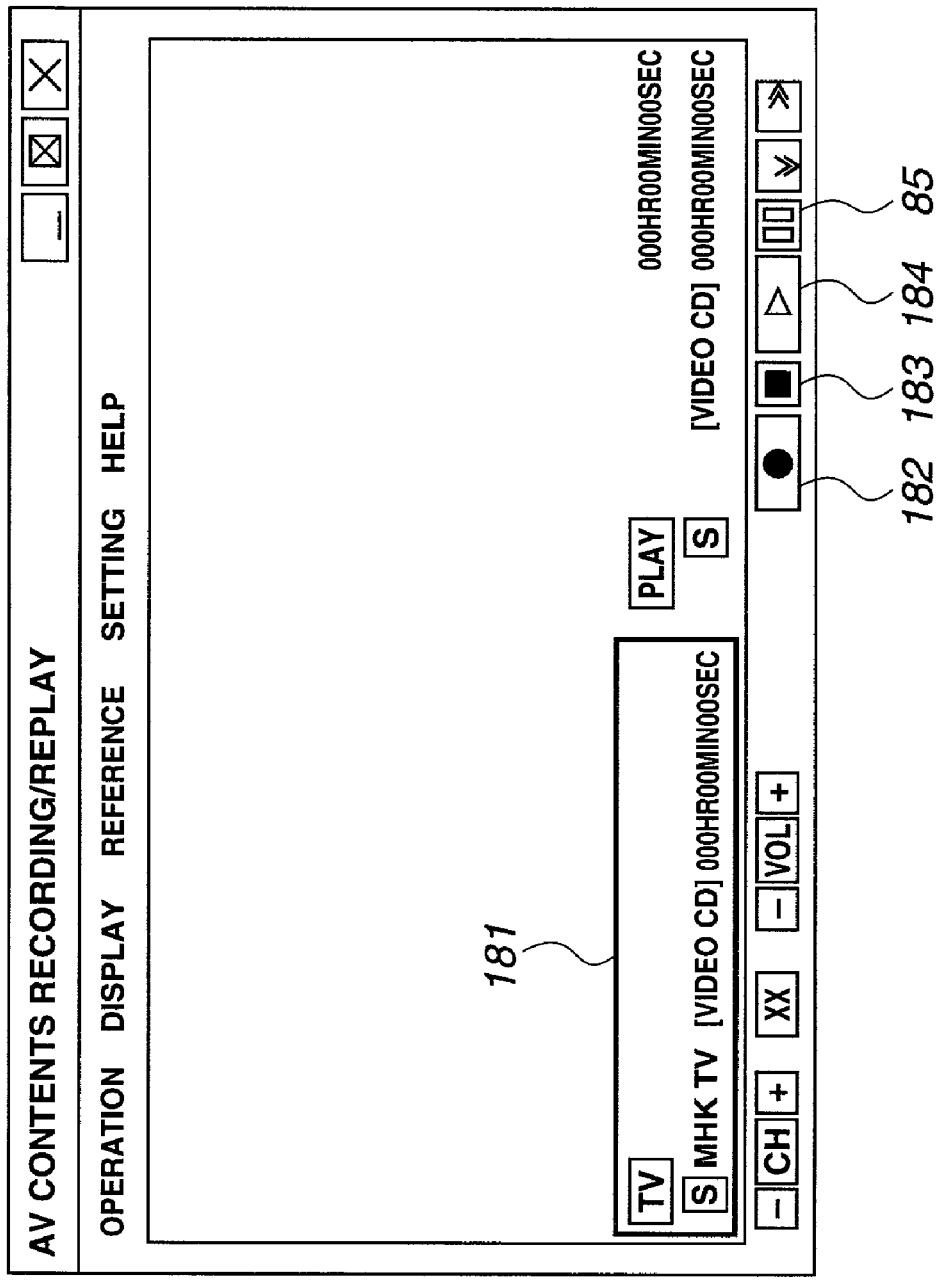
FIG. 10 illustrates a picture displayed on a CRT of the personal computer.

The picture the recording and/or reproducing program 101 displayed on the CRT 30 of the personal computer 1 is hereinafter explained. FIG. 10 shows a picture displayed on the CRT 30 of the personal computer 1 when the picture recording operation is possible.

In a picture recording window 181 are set a channel for recording, a recording mode etc. When the picture recording is started, the recording and/or reproducing program 101 sets the operation of the tuner 54 of the picture processing board 34 or the MPEG encoder 58 of the picture processing board 34, based on the setting of the picture recording window 181, to generate pre-set AV contents 151 and the AV contents attribute record 152 for recording on the HDD 31.

When the picture recording window 181 is selected and active, a picture recording button 182 and a recording stop button 183 are both active to enable the operation. That is, if the picture recording window 181 is selected and active, the recording and/or reproducing program 101 starts and halts picture recording when a recording button 182 is clicked and a stop button 183 is clicked, respectively.

If the picture recording window 181 is selected and active, a playback button 184 and a pause button 185 are non-active, such that the recording and/or reproducing program 101 is not in operation even when the playback button 184 or the pause button 185 is clicked, respectively.

Figure 11:
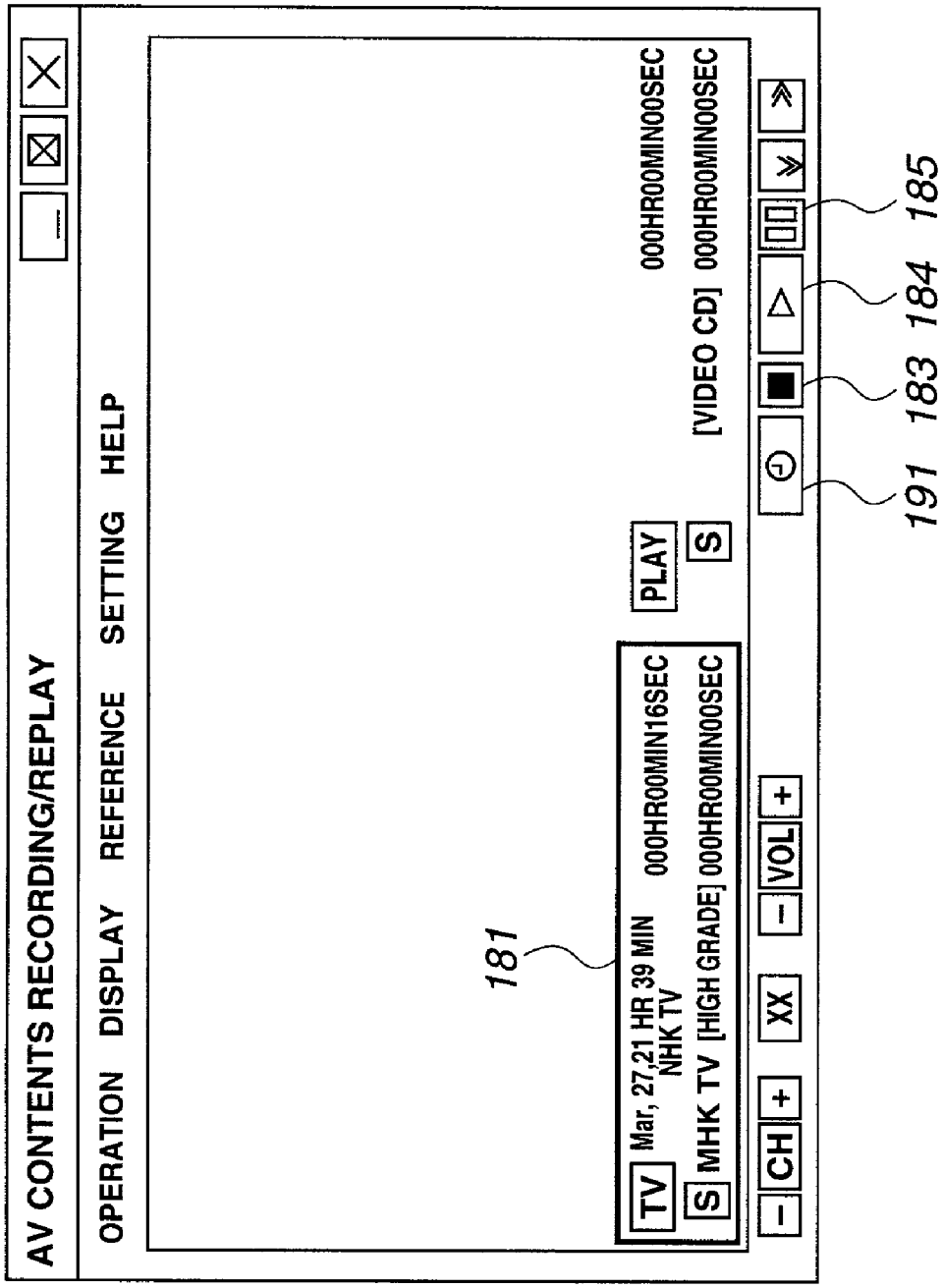
FIG. 11 illustrates a picture displayed on a CRT of the personal computer.

FIG. 11 illustrates a picture displayed on the CRT 30 of the personal computer 1 when the recording and/or reproducing program 101 has started picture recording. The picture recording window 181 displays the time elapsed as from start of picture recording and the current time in addition to the recording channel and the recording mode.

When the recording is started, the recording button 182 is changed to a recording time change button 191. The recording time is changed whenever the recording time change button 191 is clicked.

Figure 12:
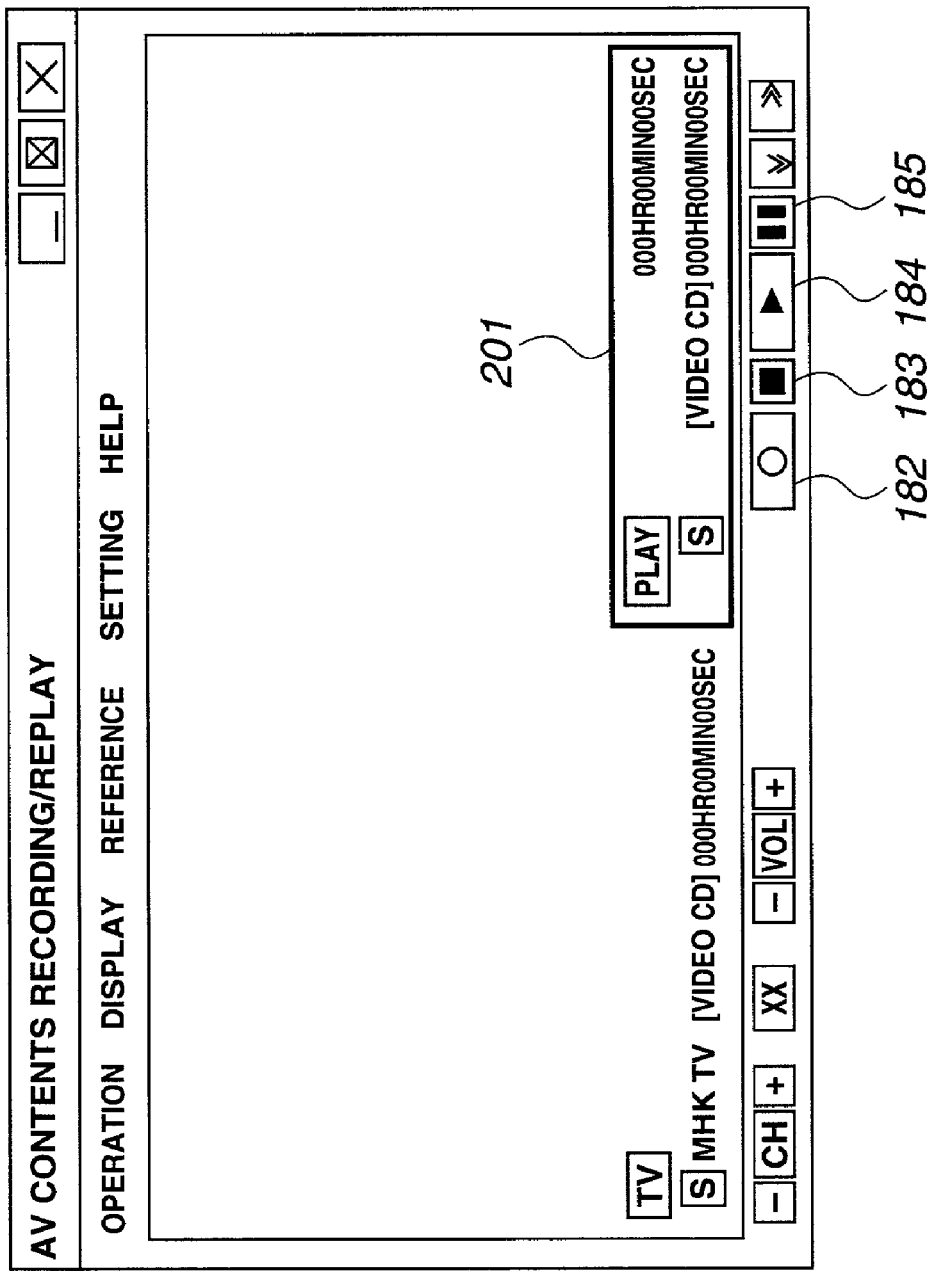
FIG. 12 illustrates another picture displayed on a CRT of the personal computer.

A picture displayed when a specified AV contents 151 or AV contents 121 are reproduced by the recording and/or reproducing program 101 is explained. FIG. 12 illustrates a picture displayed on the CRT 30 of the personal computer 1 when the recording and/or reproducing program 101 is able to perform a reproducing operation.

In a playback window 201 is displayed e.g., a picture recording mode of the AV contents to be reproduced. When the playback window 201 is selected and active, the stop button 183, playback button 184 and the pause button 185 are active to enable the operation. That is, when the playback window 201 is selected and active, the recording and/or reproducing program 101 starts, transiently stops and ultimately stops the reproduction when it is the reproducing button 184, pause button 185 and the stop button 183 that has been clicked, respectively.

On the other hand, if the playback window 201 is selected and active, the picture recording button 182 is non-active, such that the recording and/or reproducing program 101 is not in operation even when the recording button 182 is clicked.

Since the recording and/or reproducing program 101 is responsive to selection of the picture recording window 181 or the playback window 201 to change the recording button 182, stop button 183, reproducing button 184 or the pause button 185 to an active or non-active state, the user is able to know the possible contents of operation reliably and hence is able to operate speedily to prevent inadvertent operation.

The picture recording reservation is hereinafter explained. FIGS. 13 to 15 illustrate a picture displayed on the CRT 30 on startup of the recording reservation setting program 104. On startup, the recording reservation setting program 104 first demonstrates a window setting a channel for recording and date and time for start of picture recording, as shown in FIG. 13. The user sets the channel for recording and date and time for start of picture recording in each pre-set file of the window. In the illustrated embodiment, hour and minute are set in respective different fields.

If, after setting the channel for recording and date and time for start of picture recording, a specified button, a button labelled "next" in the illustrated embodiment, is clicked, the recording reservation setting program 104 reads the channel for recording and data on the date and time of start of recording, as set in a specified field, to change the window to a window setting the end time and the recording mode shown in FIG. 14.

The recording reservation setting program 104 displays the channel as set for recording and data on the recording start date and time, in a window used for setting the end time and the recording mode, while displaying the end time and the recording mode in the respective fields. It is noted that hours and minutes are set in respective different fields.

When the end time and the recording mode are set in this window, the recording reservation setting program 104 displays data usable as index for setting, such as using amount of the HDD 31. If the end time and the recording mode are set and a pre-set button, herein the button labelled "next", is clicked, the recording reservation setting program 104 reads-in the data of the end time and the recording mode, as set in pre-set fields, to change the window to a window for confirming the setting shown in FIG. 15.

The recording reservation setting program 104 displays data, such as the channel for recording, time and date of start of recording, time and date of end of recording and the recording mode, in the window used for confirming the setting. If the pre-set button, herein a button labeled "complete", is clicked, the recording reservation setting program 104 causes the AV contents 151, executing the reservation recording, to be recorded on the HDD 31, to register the AV contents attribute record 152 corresponding to the recorded AV contents 151 in the content database 122.

The AV contents 151, executing the reservation recording, has, from the outset, a moving picture data file 161, including a recording area associated with the recording time and the recording mode. If, for example, the quantity of data of a picture per second in a standard mode is 5 Mbits, the recording reservation setting program 104, set for recording for four hours in the standard mode, generates one or more moving picture data files 161, having a sum total of 9 Gbytes, in the HDD 31, in accordance with the following equation:

$$14400 \text{ sec} \star (5 \text{ M bits/sec})/(8 \text{ bits/byte})=9G \text{ bytes}$$

since four hours is equal to 14400 seconds.

The operation of the recording reservation setting program 104 generating the AV contents 151, designed for executing the reserved recording based on the pre-set recording reservation data downloaded from the server 7, is now explained. If the user boots the WWW browser 106, the personal computer 1-1 causes a pre-set picture to be displayed, based on the pre-set file stated in HTML (Hypertext Markup Language) furnished from the server 7 over the network 6.

FIG. 16 shows a picture of the personal computer 1-1 running the WWW browser 106 demonstrates on the CRT 30, based on a pre-set file supplied from the server 7. The personal computer 1-1 demonstrates the so-called program table. In this program table, there are arrayed pre-set recording reservation data download buttons 251-1 to 251-11 in association with the respective programs.

If, for example, the reservation data download button 251-1 is clicked, the recording reservation data for reservation recording of the "news at 7 o'clock" of NHK General is downloaded to the personal computer 1-1. If the reservation data download button 251-2 is clicked, the recording reservation data for reservation recording of the "TV map" of NHK General is downloaded to the personal computer 1-1. If the reservation data download button 251-3 is clicked, the recording reservation data for reservation recording of the "drama" of NHK General is downloaded to the personal computer 1-1. If the reservation data download button 251-4 is clicked, the recording reservation data for reservation recording of the "local weather" of NHK General is downloaded to the personal computer 1-1.

If the reservation data download button 251-5 is clicked, the recording reservation data for reservation recording of the "After School Club" of NHK General is downloaded to the personal computer 1-1. If the reservation data download button 251-6 is clicked, the recording reservation data for reservation recording of the "Dactylology" of NHK General is downloaded to the personal computer 1-1.

If the reservation data download button 251-8 is clicked, the recording reservation data for reservation recording of the "Tonight With You" of NHK General is downloaded to the personal computer 1-1. If the reservation data download button 251-9 is clicked, the recording reservation data for reservation recording of the "Lets Learn Braille" of NHK General is downloaded to the personal computer 1-1.

If the reservation data download button 251-10 is clicked, the recording reservation data for reservation recording of the "Professional Baseball" of Nippon TV is downloaded to the personal computer 1-1. If the reservation data download button 251-11 is clicked, the recording reservation data for reservation recording of the "Friday TV of Sun 1" of TOTAL BITS OF A PICTURE (TOTAL_BITS) is downloaded to the personal computer 1-1.

Since the recording reservation data includes data necessary for recording reservation explained with reference to FIGS. 13 to 15, except the recording mode, the personal computer 1-1 is able to record the AV contents of executing the reserved recording in the HDD 31, even in the absence of setting by the user, if the recording mode is previously set, and if the recording reservation data downloaded on actuating the recording reservation data downloading buttons 251-1 to 251-11 is used.

FIG. 17 shows an example of recording reservation data constituted by text data.

The "Content-type: application/x-tv-program-info; charset_jis", indicated on line 1 of the recording reservation data, indicates that this data is the recording reservation data. In line 3 of the recording reservation data is stated, next to "station:", data for specifying a channel for recording. For example, in "station: Nippon TV" of FIG. 17, data for specifying channel for recording is "Nippon TV".

The data for specifying the channel for recording is converted into data specifying a pre-set channel (broadcasting station) by processing in which ambiguous description in a pre-set range is allowed and which exploits the channel conversion file shown in FIG. 18.

For example, in a character sequence of the channel conversion file "4, 0, 0, 4, Nippon Television, Nippon TV, Nittele, Nippon TV Broadcasting Network, NTV", the first numerical figure from left "4" is data specifying the channel, the numerical figure "4" to the right of the third comma from left is channel representing data and the letter sequence to the right of the fifth comma from left, divided by commas, that is "Nippon TV", "Nittele", "Nippon TV Broadcasting Network" and "NTV" denote letter sequences for matching to the pre-set letter sequence of the channel conversion file.

For example, if line 3 of the recording reservation data states: "station: Nippon TV", the recording reservation setting program 104 checks whether or not the letter string "Nippon TV" next to "station" is in agreement with the letter string next to the fifth comma from left in the channel conversion file.

If the letter sequence "4, 0, 0, 4, Nippon Television, Nippon TV, Nittele, Nippon TV Broadcasting Network, NTV" is included in the channel conversion file, as shown in the embodiment of FIG. 18, the recording reservation setting program 104 verifies that the letter sequence "Nippon TV" (lying to the right of the fifth comma from left) is matched to the letter sequence of the channel conversion file. If the letter sequence of the recording reservation data is matched to that of the channel conversion file, the recording reservation setting program 104 sets the data specifying the matched channel of the same line of the channel conversion file as a channel.

For example, if the letter sequence "4, 0, 0, 4, Nippon Television, Nippon TV, Nittele, Nippon TV Broadcasting Network, NTV" is matched to the letter sequence of the recording reservation data, the channel 4 is set.

So, if the letter sequence for specifying the channel in the recording reservation data is one of "Nippon Television, Nippon TV, Nittele, Nippon TV Broadcasting Network, NTV", the remote controller 4 can set the channel 4 based on the recording reservation data.

So, even if the letter sequence specifying the channel of the recording reservation data is ambiguous to more or less extent, the remote controller 4 can set the pre-set channel based on the recording reservation data.

There is stated, on lines 4 to 7 of the recording reservation data, data for specifying the date and time of starting the recording, whereas, on line 8 thereof, there is stated data specifying the recording end time.

The recording reservation data can not only be downloaded from the server 7, but also be appended to an E-mail for transmission to the personal computer 1-1. Since the recording reservation data is constituted by letter string data, the user of the personal computer 1-2 is able to prepare the recording reservation data easily using e.g., a ubiquitous application program, such as a word processor or a text editor.

The format explained with reference to FIG. 17 is called TVPI (TV Program Information). The specifications of the TVPI are hereinafter explained.

1. Data Rules

The file extension in saving TVPI as a file is TVPI (TV Program Information).

Although data is text data, Content-Type is application/x-tv-program-info such that only the 2-byte line feed codes of 0x0d and 0x0a are allowed.

In the TVPI, data of the broadcasting station is handled, however, as for the alphabet for the name of the broadcasting station, any of Ascii, 2-byte code numerical figures or alphabets will do. The use of the so-called half-size katakana is, however, not allowed.

The name of the broadcasting station is not defined strictly. The broadcasting station is specified by ambiguous retrieval having several sorts of names inclusive of different names.

The letters indicating year, month, date, hour or minute (alphabets for abbreviation of month names in English, numerical figures and colons) are limited to ascii (1-byte code).

2. Data Structure

The TVPI data is made up of "a header portion" and a "memo portion". The "memo portion" can, however, be dispensed with and abbreviated, if so desired.

The header and memo portions are separated from each other by one or more lines.

From these specifications, no void line in the leading portion of the file is allowed, with the header portion being up to the first void line and with the memo portion beginning at the non-void line following the first void line.

Header Portion
Content-type:             application/x-tv-program-info;
charset=shift_jis
version: 1
station: NHK
    :
    :
void line
memo portion today's news
sports corner
topics at home and abroad
:
:

In the header portion, several fields are defined. Each field is stated by "name of field: value" on the one-line-one-field basis. The letters of the field name is stated in ascii, with there being no distinction between upper and lower case letters.

3. Definition of the Field of the Header Portion

The name of the filed that can be stated in the header portion and the method for stating the values are as follows:

Content-type
Indispensable field:
Declaration of content type.
It must be placed at the leading end of the file. The type is to be only application/x-tv-program-info.
"; charset=letter encode" is added after type to render it possible to declare the encoding of the letter set used in the data.

version:
Indispensable field:
The data version is specified. Only one data version is presently allowed.

Station:
The name of the broadcasting station is specified by the letter sequence.
The alphabets can be used in ascii or in the 2-byte code.

Year:
A field that can be omitted.
The year specifies the year A.D. of start of recording.
It specifies the four-digit numerical figure, such as "1999" (letter code is limited to ascii).
If this field is omitted, the client side construes that the year of data acquisition has been specified.

Month:
A field that is recommended to be used.
It specifies the recording starting month.
It specifies the three letter abbreviation {Jan (Feb|Mer|Apr|May|Jun|Jul|Aug|Sep|Oct|Nov|Dec)}. It is limited to ascii, with there being no distinction between upper and lower case letters).
If this field is omitted, the client side construes that the month of data acquisition has been specified.

Date:
A field that is recommended to be used.
It specifies the recording reservation date.
It specifies two digit numerical figures of 1 to 31 at the maximum (letter code is limited to ascii).
If this field is omitted, the client is to interpret that the date of acquisition of has been specified.
If a date that is not real, such as April 31, or February 29 of a year other than a leap year, is specified, the client side is to interpret that the date is the date of the next month corresponding to the difference from the last date of the real month. For example, if 4/31 is specified it is 5/1 form 31=30=1.

Start:
An indispensable field.
It specifies the recording start time.
It specifies the time in 24-hour system, such as 13.00. One-digit figure is allowed for both the hour and the minute. The letter code is limited to ascii for both numerical figure and colon.
The minute is from 0 to 59. If a numerical figure equal to 60 or larger is specified, the client is not to interpret the figure to mean one hour.

The time indication exceeding 23.59 can be specified. In this case, the time thus exceeding is to mean the next day. For example, 26.00 is to mean 2.00 a.m. of the next day.

End:
An indispensable field.
It specifies the recording end time.
The recording end time is to be specified in the same format as start:, provided that it is not to be earlier in time than start.

Program-title:
A field that is recommended to be used.
It specifies the program name.

Program-subtitle:
It is an omissible field.
It specifies the program title.

Performer:
It is an omissible field.
It specifies a letter string of performers in the program.
A delimiter, for example, is not specified.

Extend:
A field that is scheduled to be added.
For a program that is likely to be extended, such as baseball game broadcasting, the maximum time of extension and steps of extension, are to be specified in minutes.
As for the form, fractional numbers are to be stated in "length [.step]". The letter code is to be limited to ascii. The step (STEP) can be abbreviated.

Clockadjusrt
It means a field scheduled to be added.
If TVPI is to be acquired over the network, the time on a timepiece of a server furnishing the TVPI is to be notified.
The server time is to be stated "yyyymmddhhmmss" (for example, 20 o'clock, 6 minute 9 second of Sep. 16, 1999→19990916200609. The letter code is limited to ascii. This enables the enclosed timepiece to be corrected, while enabling the latest acquisition time in case plural overlapping reserves are entered.

Url:
A field scheduled to be added.
It states URL. Plural fields can be stated.
By kicking this URL to the browser in replay, it is possible to browse a page interlocked to a program.

Url-begin:
Url-end:
A field scheduled to be added.
If this field is stated next to the [url:] field, it sets the time period the URL remains effective.
The offset from the leading end is stated by "hhmmss". The letter code is limited to ascii.

Two sample data are shown below:
sample data (1)
Content-type: application/x-tv-program-info; charset=shift_jis
version: 1
station: NHK
year: 1999
month: 1
date: 26
start: 19:00
end: 57:00
program-title: NHK news 7
performer: Sony Hanako
Today's news
Sports corner
Topics both at Home and Abroad
Exchange and Stock Information
Weather Information etc.
Sample data (2)

Content-type: application/x-tv-program-info;
charset=shift_jis
version: 2
station:
year: 1999
month: 10
date: 14
start: 01:00
end: 03:57
extend: 90, 10
clockadjust: 19990916210000
url: http://www.uspto.gov/
url: http://www.uspto.gov/wep/menu/
url-begin: 003145
url-end: 003215
url: http://www.uspto.gov/wep/
program-title: F1 grande-prix (Italy)

The operation of generating AV contents 151 executing the reserved recording based on the recording reservation data appended to a pre-set E-mail received from the personal computer 7 can be carried out by a method other than that shown in FIG. 16.

Figure 19:
FIG. 19 illustrates a picture displayed on a CRT by a personal computer running a private information management program.

FIG. 19 illustrates a picture displayed on the CRT 90 by the personal computer 7 operating the personal information manager program. When the personal information manager program is in operation, the personal computer 7 causes a so-called scheduled input picture to be displayed. On this scheduled input picture, there are arranged a case name input field 201, in which to enter a scheduled case name, a scheduled site input field 202, in which to enter the scheduled site, a scheduled start date input field 202, in which to enter the scheduled start date, a scheduled start time input field 204, in which to enter the scheduled start time, a scheduled end date input field 205, in which to enter the scheduled end date, and a scheduled end time input field 206, in which to enter the scheduled end time.

When generating recording reservation data, a user inputs a title of a program to be appointed for recording, in the case name input field 201, while inputting the channel in the site input field 202. The user also inputs the airing start date of a program in the scheduled start date input field 203, while inputting the scheduled start date in the date input field 203, while inputting the scheduled start time in the scheduled start time input field 204 and inputting the program airing end date in the scheduled end date input field 205 and in the scheduled end time input field 206, respectively.

For example, in an example shown in FIG. 9, "closeup ancient age" is entered as a program title in the case name input field 201 "1" indicating a channel 1, is input to the site input field 202 as a channel over which the program is aired, "1999/06/01" for Jun. 1, 1999, indicating the date of start of airing of the program, is input to the scheduled start date input field 203, "21:00" indicating the time of start of the airing of the program, is input to the scheduled start time input field 204, "1999/06/01" for Jun. 1, 1999, indicating the date of end of airing of the program, is input to the scheduled end date input field 205, and "21:45" is input as the program airing end time to the scheduled end time input field 206.

After inputting the pre-set data, the personal information manager program of the personal computer 7 generates recording reservation data of the v-calendar system, in association with the data input to the case name input field 201, site input field 302, scheduled start date input field 203, scheduled start time input field 204, scheduled end date input field 205 and to the scheduled end time input field 204, subject to designation of pre-set commands by the user.

Figure 20:
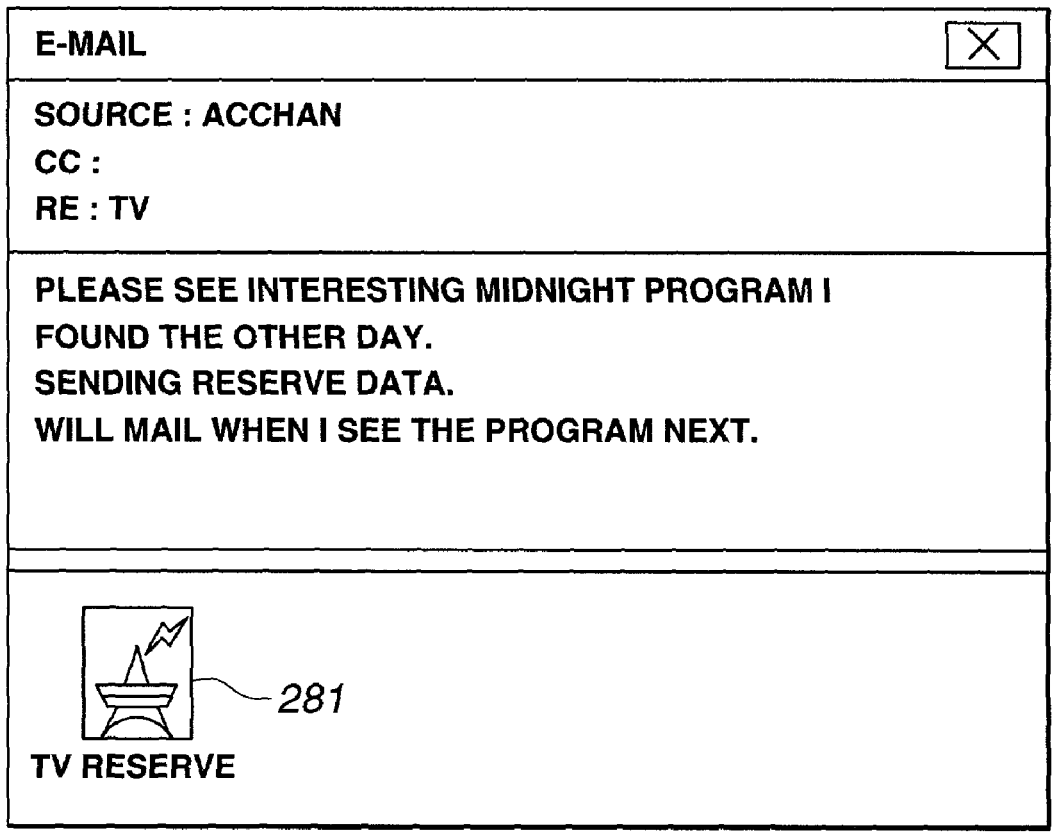
FIG. 20 illustrates a picture of an E-mail program of a personal computer demonstrating an E-mail having recording reservation data of the v-calendar system appended thereto.

The user of the personal computer 7 attaches recording reservation data of the v-calendar system to the E-mail to transmit the E-mail to the personal computer 1. FIG. 20 shows an example of a picture displayed on the CRT 90 by an E-mail program, similar to an E-mail program 106 of the personal computer 1, and which displays an E-mail with attached recording reservation data of the v-calendar system. On a screen of the E-mail program, demonstrating an E-mail with the recording reservation data of the v-calendar system attached thereto, an icon 281 corresponding to the recording reservation data of the v-calendar system is displayed.

When the personal computer 1 receives the E-mail, having the v-calendar system recording reservation data appended thereto, the E-mail program 106 of the personal computer 1 displays a picture similar to that shown in FIG. 20 on the CRT 30.

The E-mail program 106 of the personal computer 1 receives the-mail, carrying the v-calendar system recording reservation data transmitted from the personal computer 7, to record the v-calendar system recording reservation data independently, subject to actuation of the icon 281 for the v-calendar system recording reservation data, as displayed on the screen of the E-mail program 106. Alternatively, the E-mail program 106 sends an E-mail to the reservation recording setting program 104. The v-calendar system recording reservation data contains data necessary for recording reservation as explained with reference to FIGS. 13 to 15, except the recording mode. Therefore, if the recording mode is previously set, the reservation recording setting program 104 of the personal computer 1 is able to record the AV contents 151 executing the reservation recording in the HDD 31, even in the absence of the setting from the user of the personal computer 1, on the condition that the recording reservation data appended to the E-mail is utilized.

FIG. 21 shows an example of the v-calendar system recording reservation data, which is made up of text data.

In the recording reservation data, "BEGIN: VCALENDAR" on line 1 specifies that this data is the data of the v-calendar system.

On line 5 of the v-calendar system recording reservation data, there is stated data specifying date and time of starting the recording next to "DTSTART". For example, in "DTSTART: 19990601T210000Z" in FIG. 16, "19990601" sandwiched between "DTSTART:" and "T" denotes that the recording start date is Jun. 1, 1999, whilst "210000" sandwiched between "T" and "Z" indicates that the recording start time is 21:00:00.

Similarly, on line 6 of the recording reservation data of the v-calendar system, there is stated data specifying date and time of recording termination. For example, in "DTEND: 19990601T214500Z" in FIG. 21, "19990601" between the "DTEND:" and "T" denotes that the recording end date is Jun. 1, 1999 and "214500" between "T" and "Z" denotes that the recording end time is 21 hour 45 minute 00 second.

Similarly, on line 7 of the recording reservation data of the v-calendar system, there is stated, next to "LOCATION", data specifying the recording channel. For example, "LOCATION:1" of FIG. 21 indicates recording of one channel.

On line 9 of the recording reservation data of the v-calendar system, there is stated, next to "DESCRIPTION" the name of the program to be recorded. In FIG. 21, "DESCRIPTION: close up ancient times" denotes that the name of the program to be recorded is the "closeup ancient times".

In this manner, by the user of the personal computer 7 transmitting an E-mail, having attached thereto the E-mail, having attached thereto the embodiment reservation data, the user of the personal computer 1 is able to record the pre-set program readily.

Figure 22:
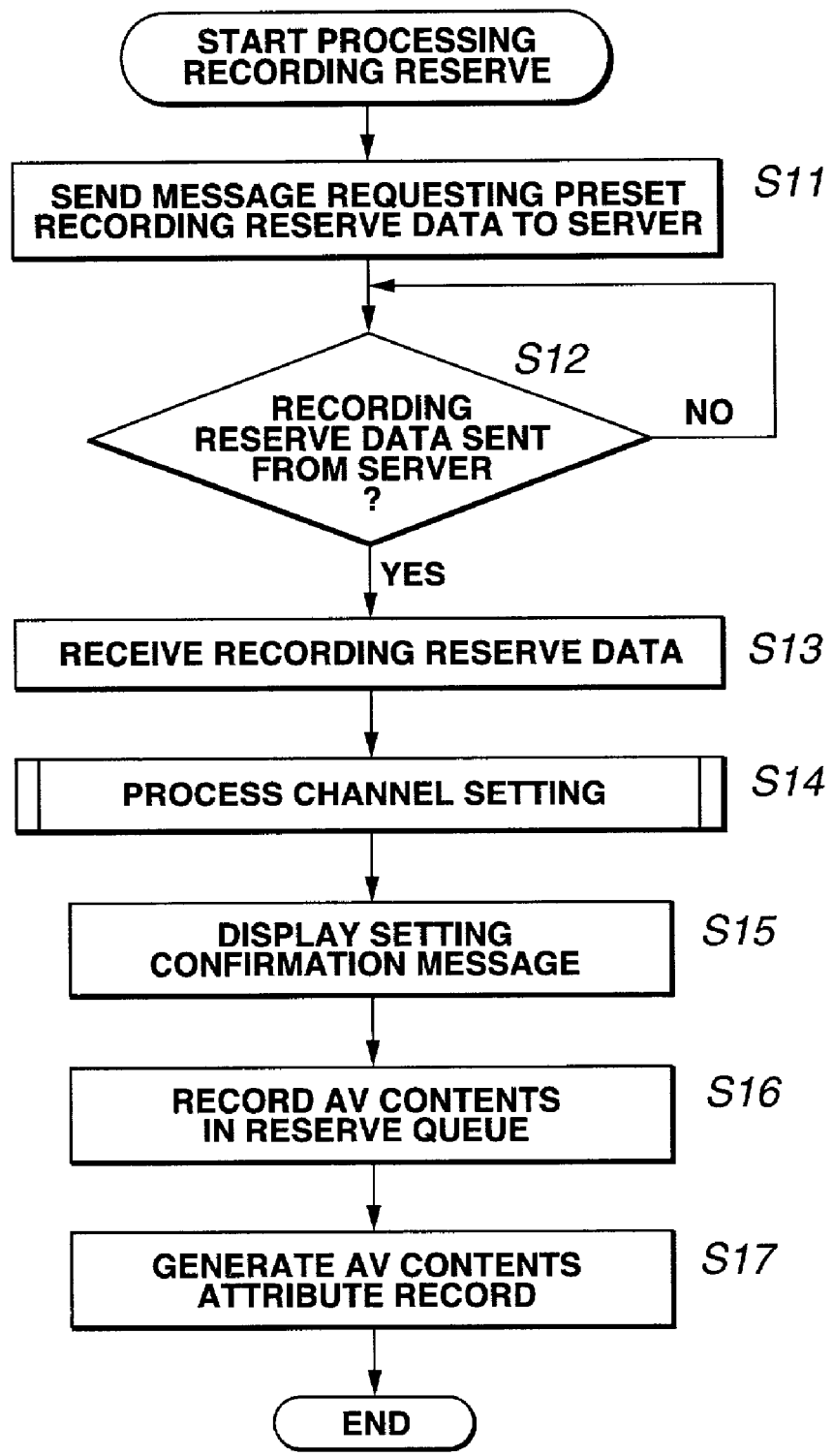
FIG. 22 is a flowchart for illustrating the processing for recording reserving.

Referring to the flowchart of FIG. 22, the processing for recording reservation in case the reservation recording setting program 104 is executed using the WWW browser 106 is explained. At step S11, the WWW browser 106 verifies whether or not the recording reservation data has been transmitted from the server 7. If it is verified that the recording reservation data has not been transmitted from the server 7, the WWW browser 106 reverts to step S12 to repeat the processing until the recording reservation data has been transmitted from the server 7. If it is verified at step S12 that the recording reservation data has been transmitted from the server 7, the WWW browser 106 advances to step S13 where it receives the recording reservation data to furnish the received recording reservation data to the reservation recording setting program 104.

At step s14, the reservation recording setting program 104 executes the processing for channel setting based on the supplied recording reservation data. The processing for channel setting will be explained subsequently in detail with reference to FIG. 23.

At step S15, the reservation recording setting program 104 displays a message certifying to the reservation setting in e.g., a window shown in FIG. 15.

At step S16, the reservation recording setting program 104 records AV contents in reservation queue, inclusive of a moving picture data file 161 which has secured a pre-set area of the HDD 31, based on the supplied recording reservation data. At step S17, the reservation recording setting program 104 causes the contents database 152 to generate the AV contents attribute record 152, corresponding to the AV contents in reservation queue, based on the supplied recording reservation data, to terminate the processing.

In this manner, the reservation recording setting program 104 and the WWW browser 106 is able to execute the reservation of recording of a pre-set program speedily.

Figure 23:
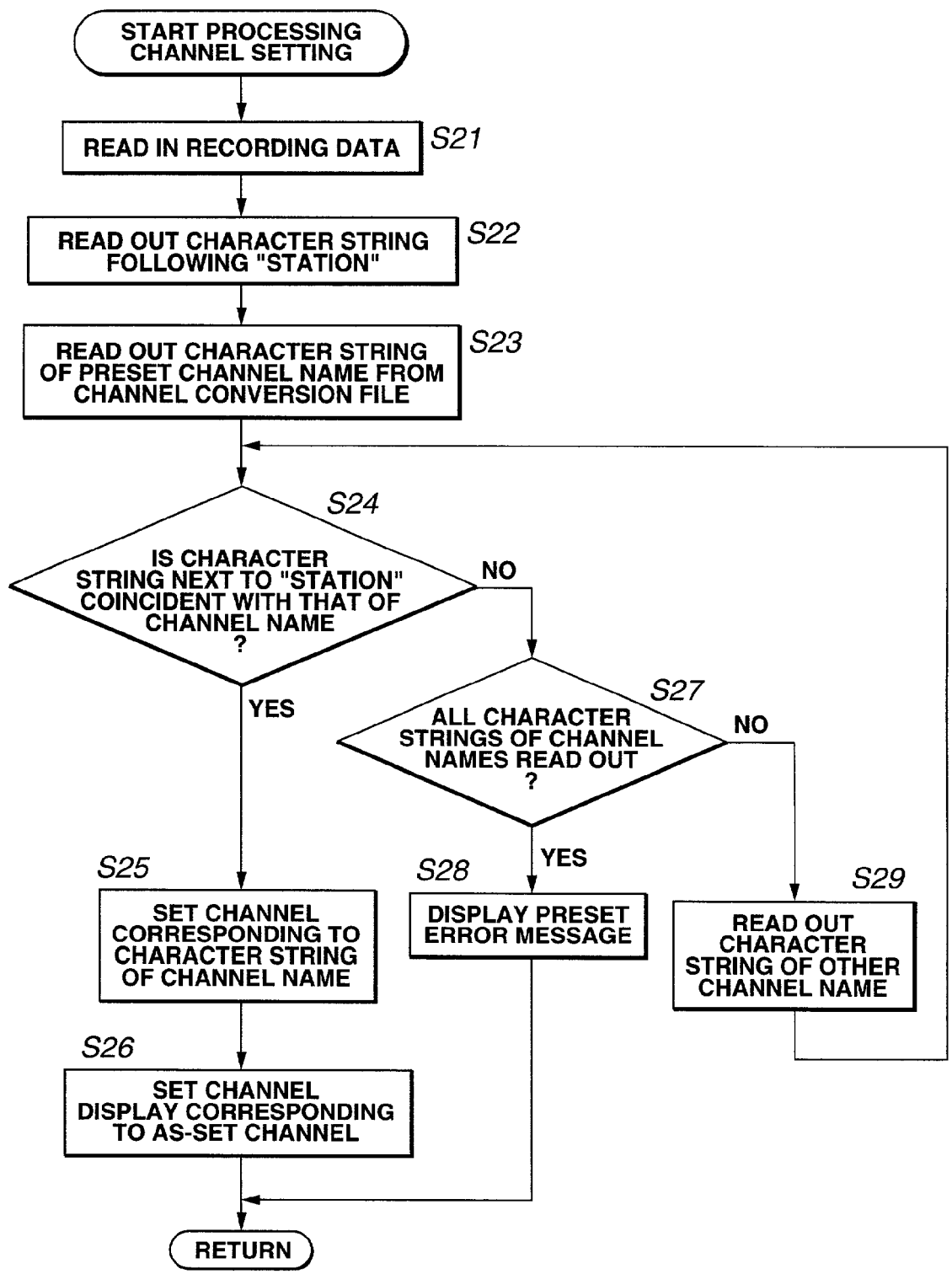
FIG. 23 is a flowchart for illustrating the processing for channel setting.

The processing for channel setting, corresponding to step S14 of FIG. 22, is now explained with reference to the flowchart of FIG. 23. At step S21, the reservation recording setting program 104 reads-in the recording reservation data furnished from the WWW browser 106. At step S22, the reservation recording setting program 104 reads out the character string next following "station" of the recording reservation data.

At step S23, the reservation recording setting program 104 reads out a character string of a pre-set channel name from a channel conversion file. At step S24, the reservation recording setting program 104 verifies whether or not the character string next following "station" is coincident with the character string of a pre-set channel name. If it is verified that character string next following "station" is coincident with the character string of the pre-set channel name, the reservation recording setting program 104 proceeds to step S25 to set a channel corresponding to the character string of the pre-set channel name.

At step S26, the reservation recording setting program 104 sets channel demonstration corresponding to the channel as set at step S25 (that is sets data for channel demonstration and data for channel name demonstration) to terminate the processing.

If it is verified at step S24 that character string next following "station" is not coincident with the character string of the pre-set channel name, the reservation recording setting program 104 proceeds to step S27 to verify whether or not the totality of the character strings of the channel names have been read out. If it is verified that the totality of the character strings of the channel names have been read out, the reservation recording setting program 104 proceeds to step S28 to display a message reading that no channel has been found on a CRT 30 to terminate the processing.

If it is verified at step S27 that the totality of the character strings of the channel names have not been read out, the reservation recording setting program 104 proceeds to step S29 to read out a character string of an other channel name. The reservation recording setting program 104 then reverts to step S24 to repeat the processing for verifying the possible character string coincidence.

As described above, the reservation recording setting program 104 is able to set a pre-set channel despite certain ambiguity in the character string next following the "station" of the recording reservation data.

Figure 24:
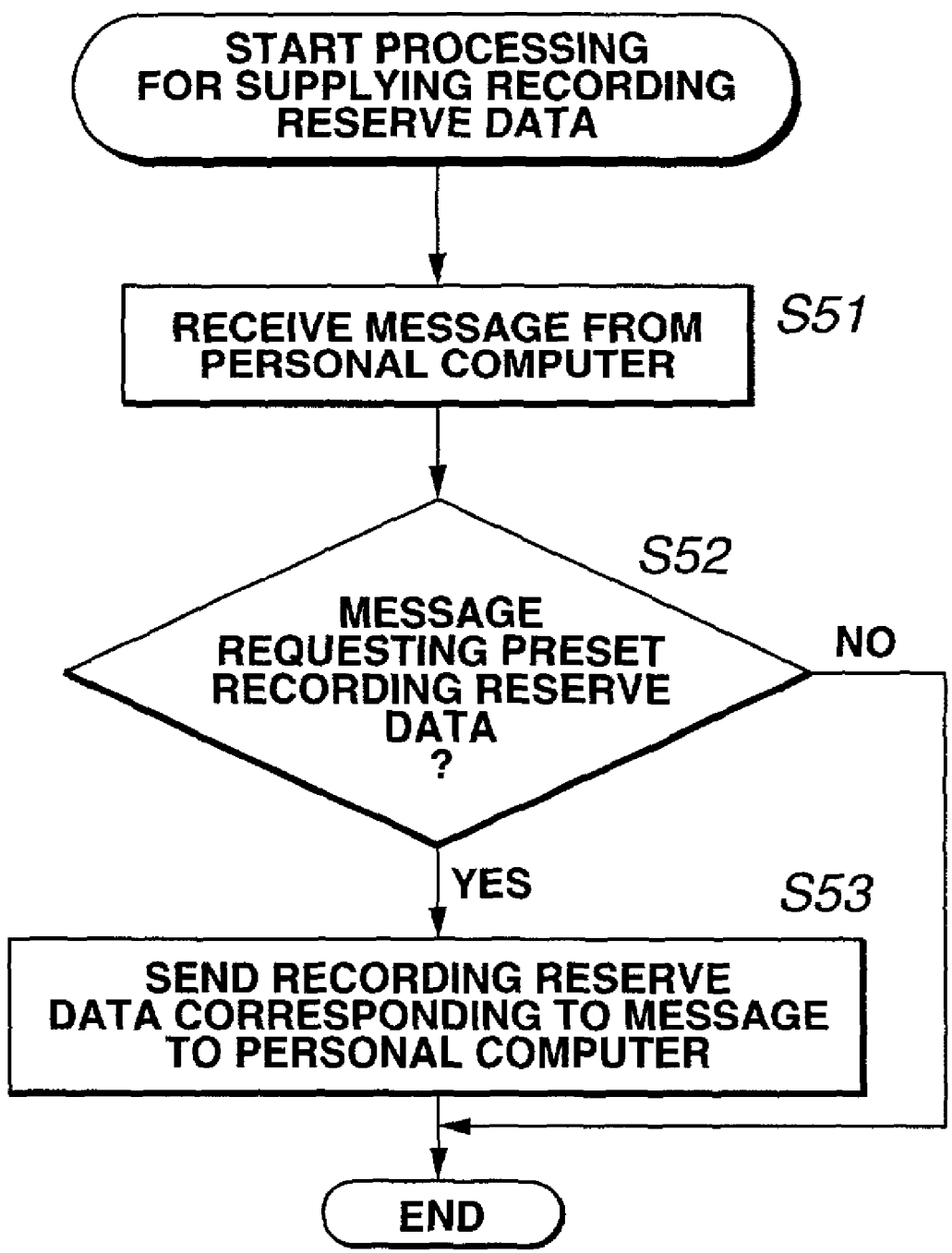
FIG. 24 is a flowchart for illustrating the processing of a reserved recording.

Referring to the flowchart of FIG. 24, the processing for furnishing recording reservation data by a server 7 in case the Web server program is loaded on a RAM 83 and a CPU 81 executes a Web server program, is now explained. At step S51, the Web server program receives a message from the personal computer 1-1 based on e.g., the HTTP. At step S52, the Web server program verifies whether or not a message received from the personal computer 1-1 is a message requesting pre-set recording reservation data. If it is verified that the message received from the personal computer 1-1 is a message requesting pre-set recording reservation data, the Web server program proceeds to step S53 to transmit recording reservation data corresponding to the message to the personal computer 1-1 to terminate the processing.

If it is verified at step S52 that the message received from the personal computer 1-1 is not a message requesting pre-set recording reservation data, the step S53 is skipped to terminate the processing.

In this manner, the server 7 furnishes pre-set recording reservation data to the personal computer 1-1.

Figure 25:
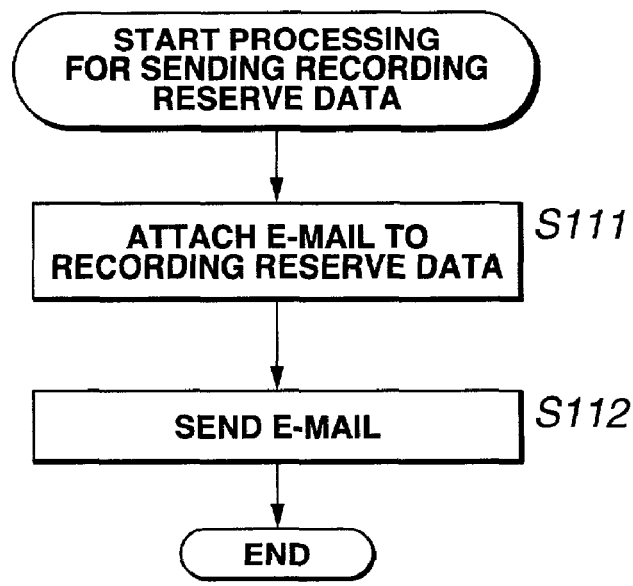
FIG. 25 is a flowchart for illustrating the processing in transmitting recording reservation datably an E-mail program of a personal computer.

The processing of transmitting recording reservation data by the E-mail program of the personal computer 7-1 is explained with reference to the flowchart of FIG. 25. At step S111, the E-mail program of the personal computer 7-1 attaches recording reservation data, previously generated and recorded, to an E-mail. At step S112, the E-mail program of the personal computer 7-1 transmits the E-mail, having the recording reservation data appended thereto, to the personal computer 1 over the network 6 to complete the processing.

As described above, the E-mail program of the personal computer 7-1 is able to transmit the recording reservation data to the personal computer 1. It is possible for the E-mail program to attach the recording reservation data appended to the E-mail received from a personal computer 7-2 at step S111 to its E-mail.

Figure 26:
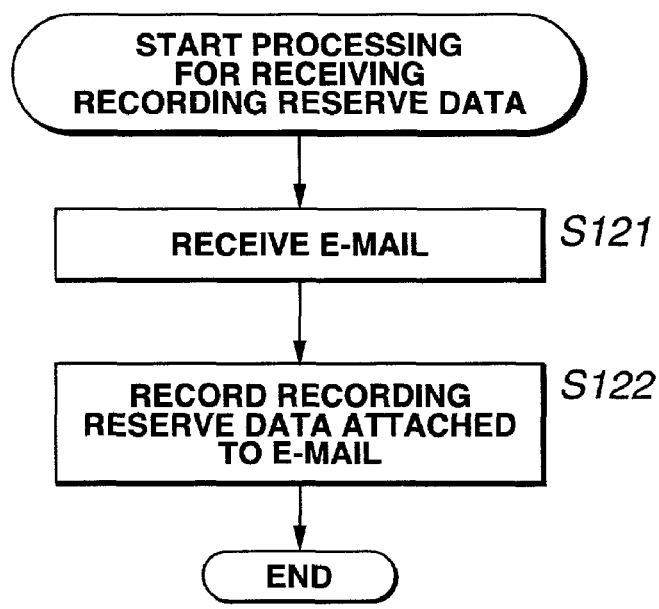
FIG. 26 is a flowchart for illustrating the processing for recording reserving by a reserved recording setting program of a personal computer.

The processing of reception of the recording reservation data by the E-mail program 106 of the personal computer 1 is explained with reference to the flowchart of FIG. 26. At step S121, the E-mail program 106 of the personal computer 1 receives an E-mail, having attached thereto the recording reservation data received from the personal computer 7-1 or 7-2, over the network 6. At step S122, the E-mail program 106 of the personal computer 1 records the recording reservation data, attached to the E-mail, in the RAM 23 or in the HDD 31, to terminate the processing.

It is possible for the E-mail program 106 to send the recording reservation data appended to the E-mail at step S122 directly to the reservation recording setting program 104.

In this manner, the E-mail program 106 of the personal computer 1 is able to receive the recording reservation data.

Figure 27:
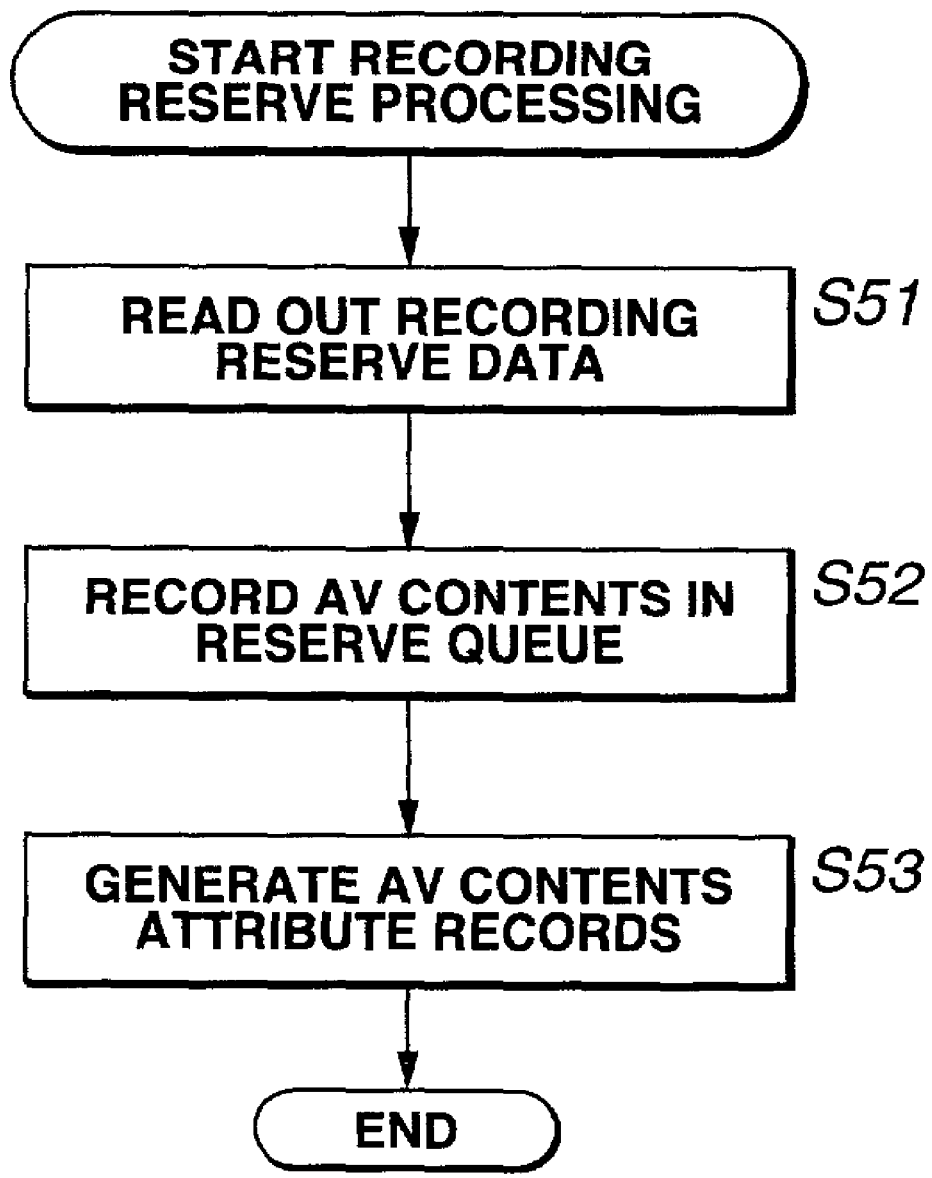
FIG. 27 is a flowchart for illustrating the processing for a reserved recording.

Referring to the flowchart of FIG. 27, the processing of recording reservation by the reservation recording setting program 104 of the personal computer 1 is hereinafter explained. At step S131, the reservation recording setting program 104 reads out the recording reservation data recorded on the RAM 23 or on the HDD 31. If, at step S32, the E-mail program 106 directly sends the recording reservation data, attached to the E-mail, to the reservation recording setting program 104, the step S51 can be omitted.

At step S132, the reservation recording setting program 104 records the AV contents 151 in an reservation queue, including the moving picture data file 161 which has secured a pre-set area of the HDD 31, based on the read-out recording reservation data. At step S13, the reservation recording setting program 104 causes a content database 152 to generate an AV content attribute record 152, corresponding to the AV contents 151 in the reservation queue, based on the recording reservation data, to complete the processing.

The reservation recording setting program 104 of the personal computer 1 executes the recording reservation processing, as described above.

Figure 28:
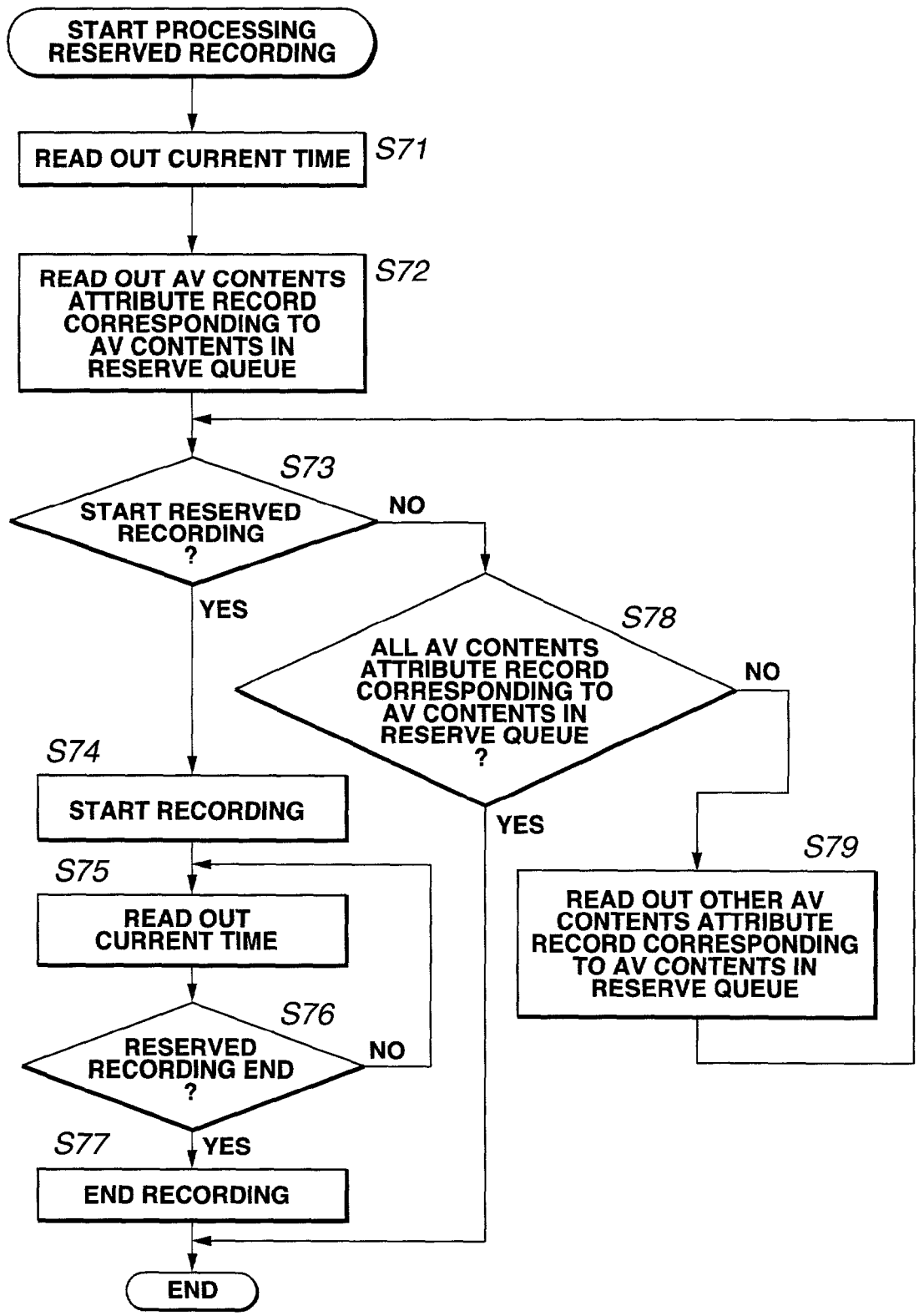
FIG. 28 is a flowchart for illustrating the processing of a reserved recording.

Referring to the flowchart of FIG. 28, the processing for the reservation recording in case the reservation monitoring program 105 resident in the RAM 23 is executed by the CPU 21 is now explained.

At step S71, the reservation monitoring program 105 reads out the current time from the RTC, not shown. At step S72, the AV contents attribute record 152 corresponding to the AV contents 151 in a pre-set reservation queue is read out.

At step S73, the reservation monitoring program 105 compares the current time to the recording start time contained in the AV contents attribute record 152 to check whether or not the reservation recording is to be started. If it is verified that the reservation recording should be started, the program moves to step S74 to start the recording. The reservation monitoring program 105 overwrites data of the picture generated in the picture processing board 34 on the previously recorded data file 161.

At step S75, the reservation monitoring program 105 reads out the current time from the RTC, not shown. At step 76, the reservation monitoring program 105 compares the current time to the recording end time contained in the AV contents attribute record 152 to check whether or not the recording reservation is to be terminated. If it is verified that the recording reservation is not at an end, the recording is continued so that the program moves to step S75 to repeat the processing of verifying the end time.

If it is verified at step 76 that the recording reservation is to be terminated, the program moves to step S77 where the reservation monitoring program 105 changes data of the AV contents attribute record 152 to a pre-set value. The recording then comes to a close to terminate the processing.

If it is verified at step S73 that the recording reservation is not to be started, the program moves to step S78 where the reservation monitoring program 105 verifies whether or not the AV contents attribute record 152 corresponding to the entire AV contents 151 in the reservation queue has been read out in its entirety. If it is verified that the AV contents attribute record 152 corresponding to the entire AV contents 151 in the reservation queue has not been read out in its entirety, the program moves to step S79, where the reservation monitoring program 105 reads out the AV contents attribute record 152 corresponding to another AV contents 151 in the reservation queue. The program then reverts to step S73 to repeat the processing for decision as to starting the recording reservation.

If it is verified at step S78 that the AV contents attribute record 152 corresponding to the AV contents 151 in the reservation queue has been read out in its entirety, there lack AV contents 151 that are to be recorded by reserve, so that processing comes to a close.

As described above, the reservation monitoring program 105 executes the recording reservation based on the AV contents 151 in the reservation queue and the current time.

The above-described sequence of operations can be executed by the hardware, however, it can also be executed by software. If the sequence of operations is executed by the software, the program constituting the software is installed in a computer built into a hard disc recorder, as a dedicated hardware, or in e.g., a ubiquitous computer in which a variety of programs are installed to execute variable functions.

Figure 30:
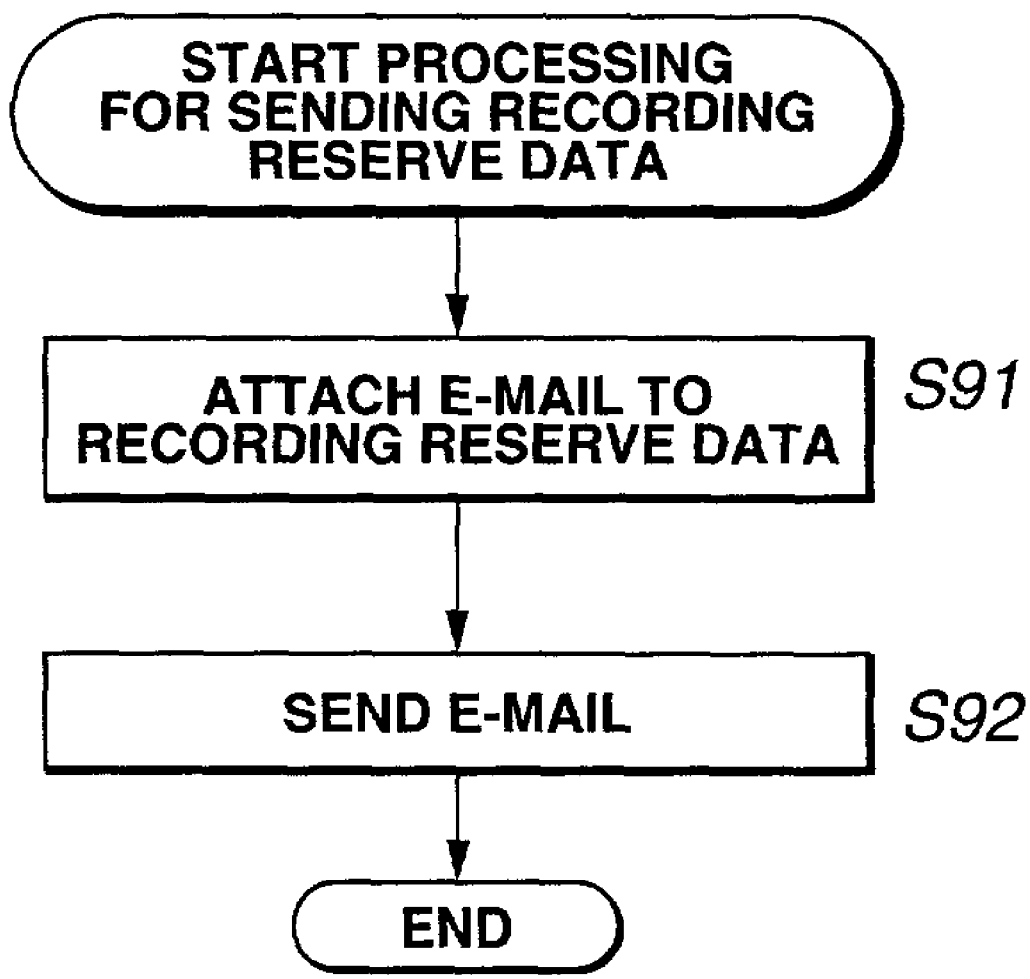
FIG. 30 is a flowchart for illustrating the processing for transmission of recording reservation datably the E-mail program.

The processing of transmitting recording reservation datably an E-mail program of the personal computer 1-2 is explained with reference to the flowchart of FIG. 30. At step S91, the E-mail program of the personal computer 1-2 appends the recording reservation data to the E-mail. The E-mail program transmits the E-mail, having the recording reservation data, appended thereto, to the personal computer 1-1 to terminate the processing.

As described above, the E-mail program is able to transmit the recording reservation data to the personal computer 1-1. The personal computer, on receipt of the E-mail, having the recording reservation data, appended thereto, is able to make the reservation for recording by the processing similar to that explained with reference to the flowchart of FIG. 22.

Figure 29A:
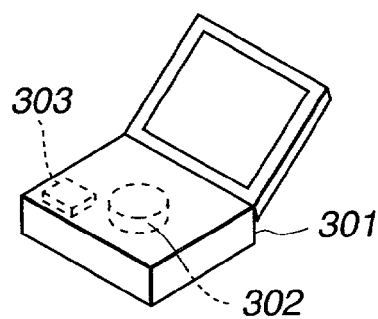
FIGS. 29A to 29C illustrate a medium.
Figure 29B:
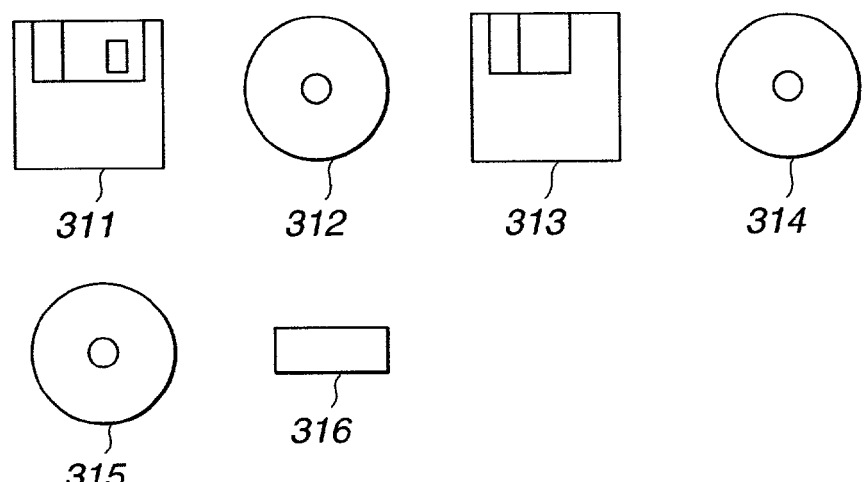
Figure 29C:
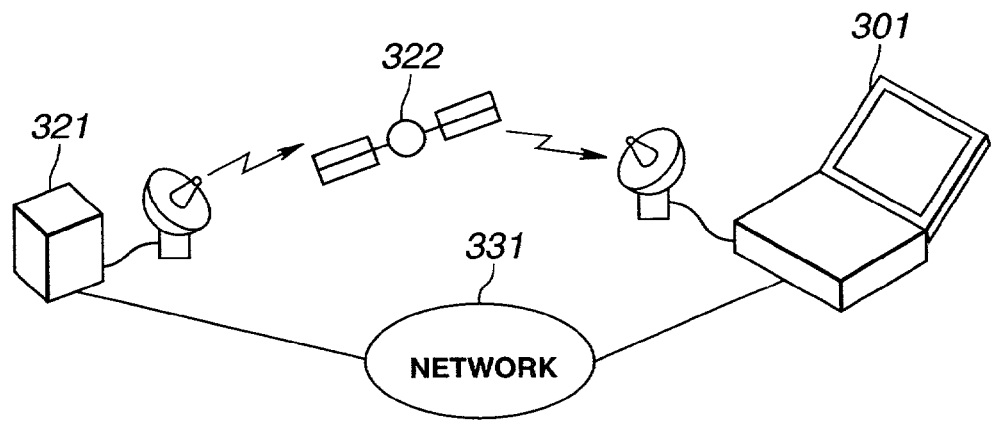

Referring to FIG. 29, a medium used in installing a program for executing the above-described sequence of operations on a computer to set a state executable by the computer is explained, taking a case wherein the computer is a ubiquitous personal computer as an example.

The program can be furnished in a pre-installed state on a hard disc 302, as a recording medium enclosed in a personal computer 301, corresponding to a hard disc enclosed in the hard disc drive 31 of FIG. 3, or in a pre-installed state on a semiconductor memory 303, as shown in FIG. 29A.

Alternatively, the program can be transiently or permanently stored in a recording medium, such as a floppy disc 311, a CD-ROM (compact disc-read only memory) 312, MO (magneto-optical) disc 313, DVD (digital versatile disc) 314, a magnetic disc 315 or a semiconductor memory 316, and furnished as packaged software, as shown in FIG. 29B Moreover, the program can be transmitted over a radio path from a downloading site 321 through an artificial satellite 322 for digital satellite broadcasting to the personal computer 301, or transmitted through a network 331, a local area network or Internet, so as to be stored in the enclosed hard disc 302 in the personal computer 301, as shown in FIG. 29.

The meaning of the medium in the specification is to be construed broadly to comprise all these mediums.

Figure 31:
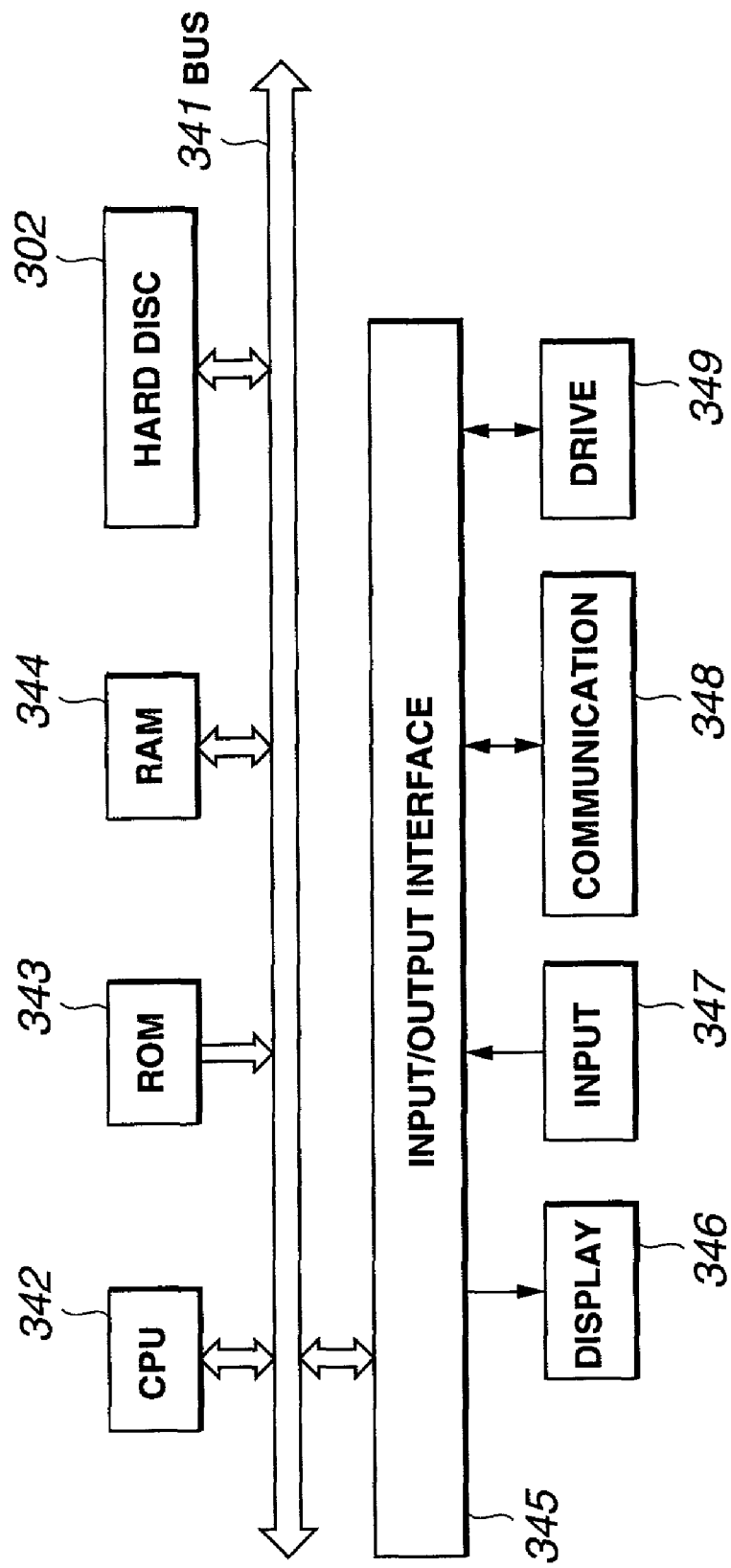
FIG. 31 shows a structure of a personal computer.

The personal computer 301 has enclosed therein a central processing unit (CPU) 342, as shown for example in FIG. 31. To the CPU 342 is connected an input/output interface 345 over a bus 341. If a command is input via an input unit 347 comprising a keyboard, a mouse etc, through the input/output interface 345, the CPU 342 executes the program stored in a read-only memory (ROM) 343 corresponding to the semiconductor memory 303 of FIG. 21A. Alternatively, the CPU 342 loads a program on a RAM (random-access memory) 344 to execute the program. This program is pre-stored on the hard disc 302, or is transmitted from an artificial satellite 322 or a network 331, received by a communication unit 348 and subsequently installed on a hard disc 302, or is read out from the floppy disc 311, CD-ROM 312, DVD 314 or the magnetic disc 315 loaded on a drive 349 so as to be installed on the hard disc 302. The CPU 342 outputs the processing results via e.g., the input interface 345 to a display 346 made up e.g., of a liquid crystal display (LCD).

Also, the step of stating the program furnished by the medium may include not only the processing executed chronologically in accordance with a stated sequence but also the processing executed in parallel or separately without being processed chronologically.

In the present specification, the system is to be construed as meaning an entire apparatus made up of plural devices.

The invention claimed is:

1. An information processing apparatus comprising:
a server configured to store a program table simultaneously displaying a plurality of programs with additional request buttons for record reservation data, such that each displayed program has its own corresponding unique button for record reservation data simultaneously displayed with the respective displayed program, selection of a respective of the request button for record reservation data directly generating recording reservation data for the corresponding displayed program;
the server further configured to allow a user to select programs on the program table by selecting one of the respective request buttons for record reservation data on the program table corresponding to a respective program, the user accessing the server from a remote device through a network; and
the server further configured to transmit the generated record reservation data to the remote device of the user upon the user selecting at least one of the additional request buttons for record reservation data in the program table, and based on the user selections of the at least one of the additional request buttons for record reservation data in the program table, the transmitted record reservation data for controlling the recording of a picture at the user remote device, and including data for specifying a channel, data indicating the date and time for starting the recording, and data indicating the date and time for terminating the recording to a picture recording apparatus.

2. The information processing apparatus according to claim 1, wherein the transmitted data is configured to control the recording of the picture stated in a text.

3. The information processing apparatus according to claim 1, wherein the transmitted data is data of a v-calendar system.

4. The information processing apparatus according to claim 1, wherein the transmitted data comprises text data including the information specifying the date and time of starting the recording, the recording start date and time specifying information being stated next to the information indicating the start of the recording reservation data "BEGIN:VCALENDAR", "DTSTART:", the information specifying the date and time of end of recording, the recording end date and time specifying information being stated next to "DTEND:", the information specifying a channel for recording, the channel specifying information being stated next to "LOCATION:", the name of a program for recording, recorded next to "DESCRIPTION:" and the information "END:VCALENDAR" indicating the end of the recording reservation data.

5. An information processing apparatus comprising:
means for storing a program table simultaneously displaying a plurality of programs with additional respective request buttons for record reservation data, such that each displayed program has its own corresponding unique request button for record reservation data simultaneously displayed with the respective displayed program, selection of a respective of the request button for record reservation data directly generating recording reservation data for the corresponding displayed program;
means for allowing a user to select programs on the program table by selecting one of the respective request buttons for record reservation data on the program table corresponding to a respective program, the user accessing the means for storing from a remote device through a network; and
means for transmitting record reservation data to the remote device of the user based on the user upon the user selecting at least one of the additional request buttons for record reservation data in the program table, and selections of the at least one of the additional request buttons for record reservation data in the program table, the transmitted record reservation data for controlling the recording of a picture at the user remote device, and including data for specifying a channel, data indicating the date and time for starting the recording, and data indicating the date and time for terminating the recording to a picture recording apparatus.

6. The information processing apparatus according to claim 5, wherein the transmitted data is configured to control the recording of the picture stated in a text.

7. The information processing apparatus according to claim 5, wherein the transmitted data is data of a v-calendar system.

8. The information processing apparatus according to claim 5, wherein the transmitted data comprises text data including the information specifying the date and time of starting the recording, the recording start date and time specifying information being stated next to the information indicating the start of the recording reservation data "BEGIN:VCALENDAR", "DTSTART:", the information specifying the date and time of end of recording, the recording end date and time specifying information being stated next to "DTEND:", the information specifying a channel for recording, the channel specifying information being stated next to "LOCATION:", the name of a program for recording, recorded next to "DESCRIPTION:" and the information "END:VCALENDAR" indicating the end of the recording reservation data.

9. An information processing method comprising:
storing a program table simultaneously displaying a plurality of programs with respective additional request buttons for record reservation data, such that each displayed program has its own corresponding unique request button for record reservation data simultaneously displayed with the respective displayed program, selection of a respective of the request button for record reservation data directly generating recording reservation data for the corresponding displayed program;
allowing a user to select programs on the program table by selecting one of the respective request buttons for record reservation data on the program table corresponding to a respective program, the user accessing the program table from a remote device through a network; and
transmitting record reservation data to the remote device of the user upon the user selecting at least one of the additional request buttons for record reservation data in the program table, and based on the user selections of the at least one of the additional request buttons for record reservation data in the program table, the transmitted record reservation data for controlling the recording of a picture at the user remote device, and including data for specifying a channel, data indicating the date and time for starting the recording, and data indicating the date and time for terminating the recording to a picture recording apparatus.

10. The information processing method according to claim 9, wherein the transmitted data is configured to control the recording of the picture stated in a text.

11. The information processing method according to claim 9, wherein the transmitted data is data of a v-calendar system.

12. The information processing method according to claim 9, wherein the transmitted data comprises text data including the information specifying the date and time of starting the recording, the recording start date and time specifying information being stated next to the information indicating the start of the recording reservation data "BEGIN:VCALENDAR", "DTSTART:", the information specifying the date and time of end of recording, the recording end date and time specifying information being stated next to "DTEND:", the information specifying a channel for recording, the channel specifying information being stated next to "LOCATION:", the name of a program for recording, recorded next to "DESCRIPTION:" and the information "END:VCALENDAR" indicating the end of the recording reservation data.

13. A tangible computer readable storage medium configured to control a computer to execute an information processing method comprising:

storing a program table simultaneously displaying a plurality of programs with respective additional request buttons for record reservation data, such that each displayed program has its own corresponding unique request button for record reservation data simultaneously displayed with the respective displayed program, selection of a respective of the request button for record reservation data directly generating recording reservation data for the corresponding displayed program;

allowing a user to select programs on the program table by selecting one of the respective request buttons for record reservation data on the program table corresponding to a respective program, the user accessing the program table from a remote device through a network; and transmitting record reservation data to the remote device of the user upon the user selecting at least one of the additional request buttons for record reservation data in the program table, and based on the user selections of the at least one of the additional request buttons for record reservation data in the program table, the transmitted record reservation data for controlling the recording of a picture at the user remote device, and including data for specifying a channel, data indicating the date and time for starting the recording, and data indicating the date and time for terminating the recording to a picture recording apparatus.

14. The tangible computer readable storage medium according to claim 13, wherein the transmitted data is configured to control the recording of the picture stated in a text.

15. The tangible computer readable storage medium according to claim 13, wherein the transmitted data is data of a v-calendar system.

16. The tangible computer readable storage medium according to claim 13, wherein the transmitted data comprises text data including the information specifying the date and time of starting the recording, the recording start date and time specifying information being stated next to the information indicating the start of the recording reservation data "BEGIN:VCALENDAR", "DTSTART:", the information specifying the date and time of end of recording, the recording end date and time specifying information being stated next to "DTEND:", the information specifying a channel for recording, the channel specifying information being stated next to "LOCATION:", the name of a program for recording, recorded next to "DESCRIPTION:" and the information "END:VCALENDAR" indicating the end of the recording reservation data.

* * * * *